United States Patent [19]

Payne

[11] Patent Number: 4,551,618

[45] Date of Patent: Nov. 5, 1985

[54] COOKING APPLIANCE INCORPORATING HEATER ENERGY COUNTER MEANS

[75] Inventor: Thomas R. Payne, Louisville, Ky.

[73] Assignee: General Electric Company, Louisville, Ky.

[21] Appl. No.: 438,622

[22] Filed: Nov. 2, 1982

Related U.S. Application Data

[63] Continuation-in-part of Ser. No. 334,039, Dec. 23, 1981, abandoned.

[51] Int. Cl.[4] .............................................. H05B 1/02
[52] U.S. Cl. ................................... 219/510; 219/486; 219/492; 307/41; 340/588
[58] Field of Search ............... 219/483, 486, 492, 493, 219/453, 508, 509, 510, 450, 451; 307/117, 39–41; 361/100, 103, 106; 340/584, 588, 589

[56]   References Cited

U.S. PATENT DOCUMENTS

| | | | |
|---|---|---|---|
| 3,612,826 | 10/1971 | Deaton | 219/453 |
| 3,906,424 | 9/1975 | Clancy et al. | 219/506 |
| 3,944,790 | 3/1976 | Tomaro et al. | 235/92 T |
| 3,974,472 | 8/1972 | Gould, Jr. | 340/337 |
| 4,044,348 | 8/1977 | Huebscher | 219/453 |
| 4,046,991 | 9/1977 | Sefton et al. | 219/497 |
| 4,256,951 | 3/1981 | Payne et al. | 219/492 |
| 4,369,354 | 1/1983 | Goedecke et al. | 219/506 |

OTHER PUBLICATIONS

European Trade Show–Handout, Busch–Jaeger Elektro GmbH, 3/2/1981.

*Primary Examiner*—M. H. Paschall
*Attorney, Agent, or Firm*—H. Neil Houser; Radford M. Reams

[57]        ABSTRACT

An arrangement for monitoring the approximate temperature of a resistive heating element selectively energized at a plurality of power levels in response to the selection by an operator of one of a plurality of power settings including OFF, which includes a heater energy counter to provide approximate heating element temperature information. The heater energy counter is incremented at a rate which is approximately proportional to the rate of increase of the temperature of the heating element when energized at the selected power level. In one form of the invention, the counter is decremented when a lower power setting or an OFF setting is selected, at a rate which is approximately proportional to the rate at which the temperature of the heating element decreases in cooling down to the temperature level associated with the new power setting. By this arrangement, the count of the counter approximately tracks the heating element temperature, thereby providing approximate temperature information. This temperature information can be used to energize an indicator light when the count of the counter exceeds a predetermined threshold count corresponding to a temperature above which the element is uncomfortably hot to the touch, which light remains energized regardless of whether the element is ON or OFF until the count is decremented below the reference value, thereby providing a visual signal to the operator that the heating element is hot.

26 Claims, 23 Drawing Figures

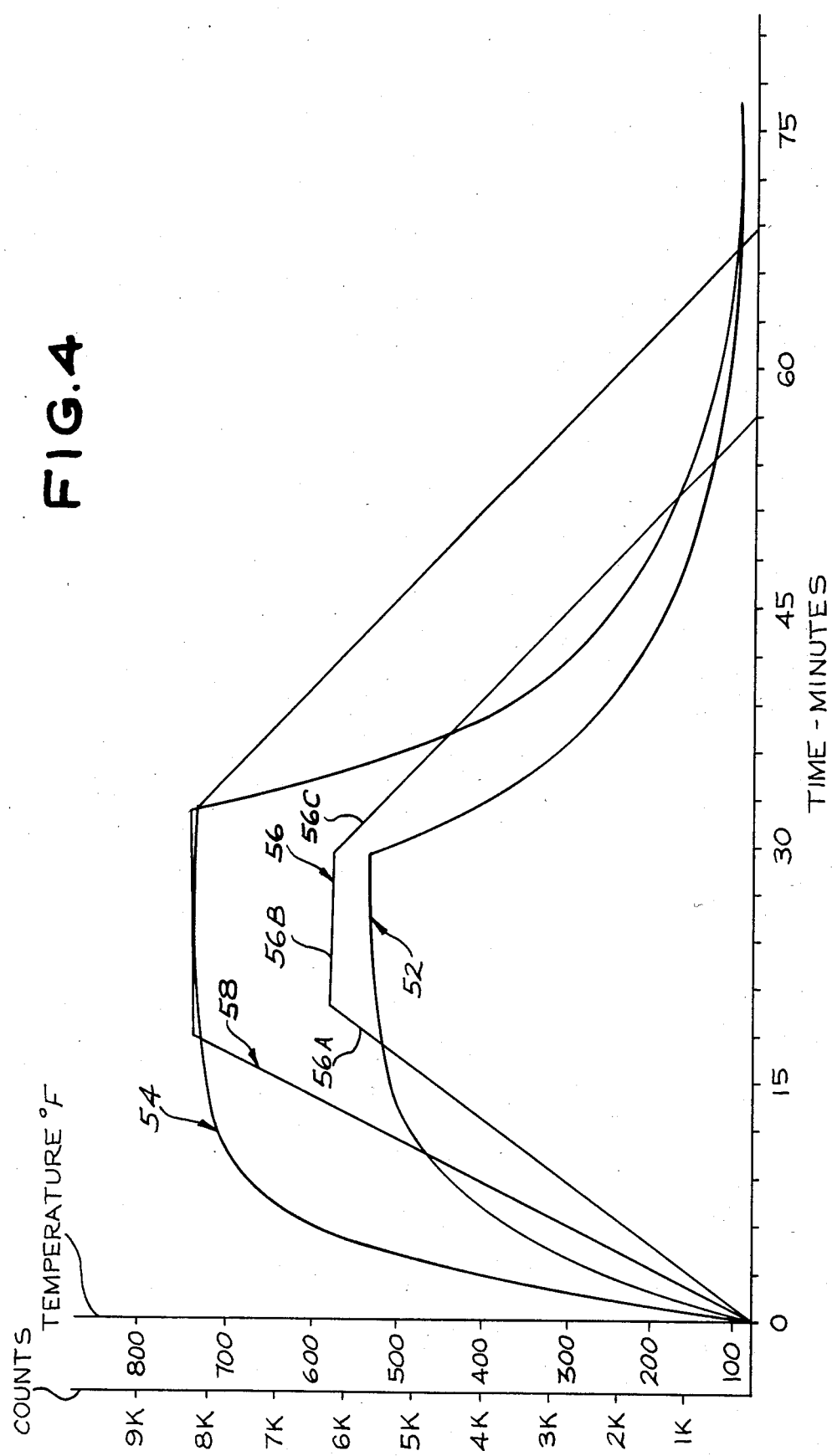

LEVEL EXCHANGE ROUTINE

COOKING APPLIANCE INCORPORATING HEATER ENERGY COUNTER MEANS

CROSS REFERENCE TO RELATED APPLICATION

This application is a continuation-in-part of commonly-assigned copending application Serial No. 334,039, filed on Dec. 23, 1981 now abandoned "Power Control for Cooking Appliance Incorporating Heater Energy Counter Means," filed in the name of Thomas R. Payne, which application is related to the following commonlyassigned, copending application, Serial No. 334,038, "Power Control for Cooking Appliance with Transient Operating Modes," filed in the names of Thomas R. Payne and Alfred L. Baker. The disclosures of the above-noted applications are hereby incorporated by reference.

BACKGROUND OF THE INVENTION

This invention relates generally to an arrangement for moniroting the operating temperature of resistive heating elements, and more particularly to such an arrangement for resistive heating elements used as surface heating units in cooking appliances such as ranges.

In controlling the power applied to a heating element employed as a surface element for a range or cooktop, it is advantageous to know the temperature of the heating element. The conventional approach to monitoring temperature has been to employ a temperature sensor placed beneath the cooking utensil containing the food being heated. This information is used primarily to provide a rapid and reasonably accurate response to changes in the power setting for the heating element. Typically, the sensor is deployed in a closed loop feedback control arrangement with control loop parameters selected to provide rapid response to operator power setting selections. This approach produces satisfactory results; however, such sensors add significant cost to the appliance. Because of this cost, ranges with multiple surface units typically employ, at most, one surface unit with a sensor in a closed loop control system. The other surface units are operated in an open loop mode with no means of taking element temperature into account when controlling element operation. The operator simply makes a power setting selection and the heating element is operated at the corresponding power level regardless of the actual temperatures of the element, utensil or food being cooked.

Another shortcoming of conventional cooking appliances generally presently available is the lack of a means of indicating to the user that the heating element is hot once the element is turned OFF. Typically, an indicator light is provided which is energized when one or more elements are turned ON and deenergized when all elements are turned OFF. The disadvantage of this approach is that a heating element remains hot for some period of time after the element has been turned OFF. For the higher power settings in particular, the element may remain hot for a relatively long time.

An open loop control arrangement for cooking appliances which provides a means of tracking the approximate heating element temperature without use of a relatively expensive temperature sensor in a relatively complex closed loop control arrangement and which would be economically practical for each heating element of a multiple element appliance would be highly desirable. Heating element temperature information provided by such an arrangement could be advantageously employed to alert the user that the heating element is uncomfortably hot to touch as well as to provide more rapid response to power setting changes than conventional open loop controls provide. With the versatility provided in microprocessor based control systems, additional advantageous uses of such temperature information to enhance appliance operation may become feasible.

Accordingly, it is a principal object of the present invention to provide an open loop arrangement for household cooking appliances employing resistive heating elements which provides approximate heating element temperature information without temperature sensor feedback.

It is a further principal object of the present invention to provide an arrangement of the aforementioned type which uses the approximate temperature information to provide a visual indication to the user when the heating element is above a predetermined threshold temperature and which continues to provide the visual indication after the heating element is turned OFF until the temperature has dropped below the threshold temperature.

SUMMARY OF THE INVENTION

The present invention provides an arrangement for monitoring the approximate temperature of one or more resistive heating elements adapted for selective energization at one of a plurality of power levels in response to the selection by an operator of one of a plurality of power settings including OFF. The temperature monitoring arrangement includes a counter which is selectively incremented at a rate in accordance with the selected power setting such that the count rate is approximately proportional to the rate of increase of the temperature of the heating element for the power setting selected. In one form of the invention, the counter is decremented when the element is turned OFF at a rate which is approximately proportional to the rate at which the temperature of the heating element decreases when deenergized. In another form of the invention, the counter is decremented when the power setting is changed from a relatively higher power setting to a relatively lower power setting including the OFF power setting at a rate selected in accordance with the lower selected power setting such that the rate of decrease of the temperature of the heating element when the element is cooling down to the selected temperature from a higher temperature associated with a higher power setting. When incremented and decremented in accordance with either form, the count of the counter provides an approximation of the actual heating element temperature. The latter form provides a better approximation under operating conditions in which the power setting is changed by the user from higher to lower without first going through the OFF setting.

In yet another form of the invention, the count of the counter is compared to a reference count representing a predetermined threshold temperature above which the heating element is uncomfortably hot to the touch. When the count exceeds this reference, an indicator light or hot light is energized and remains energized until the count is decremented below the reference value regardless of whether the element is ON or OFF. This indicator light when so energized provides a visual signal to the operator signifying that the heating element is hot.

While the novel features of the invention are set forth with particularity in the appended claims, the invention, both as to organization and content, will be better understood and appreciated from the following detailed description taken in conjunction with the drawings.

BRIEF DESCRIPTION OF THE DRAWINGS

FIG. 4 is a graph depicting representative temperature versus time curves for the heating element of the type employed in the control arrangement of FIG. 2 for various power settings;

DETAILED DESCRIPTION

A. Overview

Figure 1:
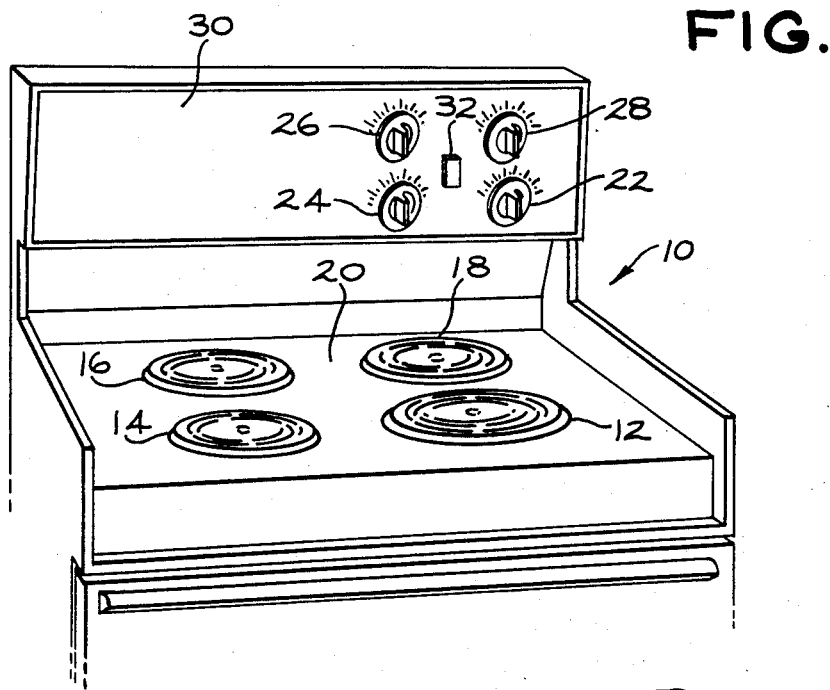
FIG. 1 is a front perspective view of a portion of an electric range illustratively embodying the temperature monitoring arrangement of the present invention.

FIG. 1 illustrates an electric cooking range 10 incorporating a control arrangement embodying the present invention. Range 10 includes four conventional electric surface resistance heating elements 12, 14, 16 and 18 supported from a substantially horizontal support surface 20. Manually operable rotary control knobs 22, 24, 26 and 28 are mounted to control panel 30. Control knobs 22, 24, 26 and 28 enable the user to select the desired power level for heating elements 12, 14, 16 and 18, respectively. A signal light 32 is mounted to horizontal surface 20 to provide a visual indication to the operator that at least one of the heating elements is relatively hot.

Figure 2:
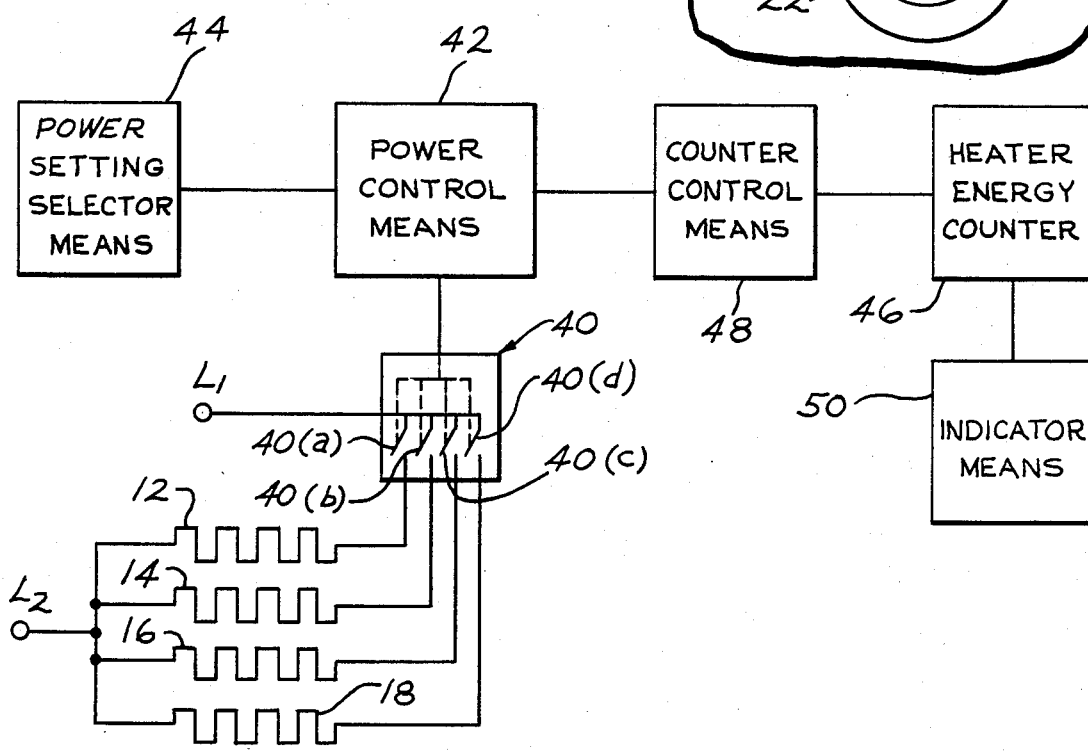
FIG. 2 is a greatly simplified functional block diagram of a control arrangement employed in the range of FIG. 1 incorporating the temperature monitoring arrangement of the present invention.

A generalized block diagram of the control arrangement for range 10 of FIG. 1 is shown in FIG. 2 wherein the heating elements 12, 14, 16 and 18 are energized by standard 60 Hz AC power signal which can be either 120 or 240 volts supplied to terminals L1 and L2. Elements 12, 14, 16 and 18 are connected electrically in parallel across lines L1 and L2. Power to the heating elements is controlled by switch means 40 connected in series with the heating elements. Switch means 40 includes separate switch means 40(a)–40(d) in series with each of the heating elements 12, 14, 16 and 18, respectively, to permit independent control of power to each of the heating elements. The switch means for each element is switched into and out of conduction in accordance with control signals generated by power control means 42.

Figure 3:
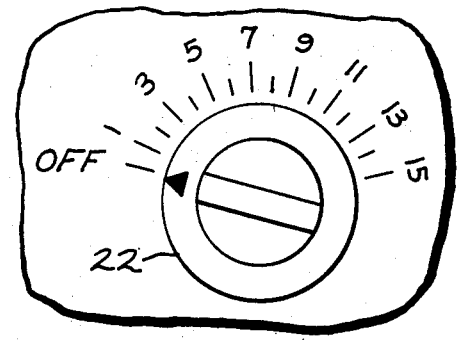
FIG. 3 is a greatly enlarged view of a portion of the panel of the range of FIG. 1 showing the details of one of the control knobs thereof.

Power control means 42 generates power control signals in accordance with the power setting selected by the operator for each heating element. Power setting selection means 44 provides power level control signals to power control means 42 representating the settings selected by manual manipulation of control knobs 22 through 28 of FIG. 1. As best seen in FIG. 3, each of control knobs 22-28 enable the user to select one of 16 available discrete power settings including an OFF power setting for the corresponding heating element. Clearly, a greater or fewer number of power settings could be provided. Also, alternative means for power setting selection by the user, for example a digital keyboard, could be employed.

Power control means 42 controls the percentage of time power is applied to each of the heating elements 12 in accordance with the power level setting selected by the operator.

In the illustrative embodiment, a predetermined control period comprising a fixed number of control intervals is employed as the time base for power control. Each heating element is switched into conduction for a particular number of control intervals during each control period, based on the corresponding operator selected power setting. The ratio of conductive control intervals to the total control intervals in the control period, expressed as a percentage, is referred to hereinafter as the duty cycle. Each control interval comprises eight cycles of the standard 60 Hz 240 volts AC power signal, corresponding to a period of approximately 133 milliseconds. Each control period comprises 128 control intervals corresponding to a period of approximately 17 seconds duration. The durations for the control interval and for the control period were selected to provide a satisfactory range of power settings for desired cooking performance, which could be implemented using relatively slow relay switching devices and programmed to make efficient use of the microprocessor memory. It is understood that control intervals and control periods of greater or lesser duration could be similarly employed.

In carrying out the control scheme, the percentage of ON time or duty cycle for each power level is obtained by switching the particular heating element into conduction for a predetermined number of control intervals during each control period. TABLE I shows the percentage ON time and the number of conductive control intervals per control period for each of the 16 power settings. The duty cycles for each of the power cycles was determined empirically to provide the desired range of cooking temperatures for satisfactory cooking performance. It is understood that other duty cycles could be similarly employed.

particular maximum count selected from this plurality of maximum counts is likewise determined by the power setting selected by the operator.

Counter control means 48 is further operative to decrement energy counter means 46. In the form of the invention to be first described herein, counter control means 48 decrements energy counter means 46 at a predetermined decrement rate in response to the selection of the OFF power setting. This decrement rate is selected to be approximately proportional to the actual rate of decrease of the heating element temperature during this cool-down phase. By incrementing and decrementing heater energy counter 46 in this manner, the count of the heater energy counter means 46 is approximately proportional to the temperature of the heating element, thereby providing an approximate measure of heating element temperature without need for a sensor. The increment rates per control period including the decrement rate for the OFF setting and maximum counts are shown in Cols. 6 and 7, respectively, of TABLE I for each of the power settings. These values were selected by a process of empirical testing directed to finding values which provide satisfactory perfor-

TABLE I

| COL. 1 SELECTED POWER LEVEL | COL. 2 % ON TIME | COL. 3 ON CONTROL INTERVALS PER CONTROL PERIOD | COL. 4 OFF CONTROL INTERVALS | COL. 5 HEATER ENERGY COUNTER INCREMENT RATE (COUNTS PER ENERGIZED CONTROL INTERVAL) | COL. 6 HEATER ENERGY COUNTER INCREMENT RATE (COUNTS PER CONTROL PERIOD) | COL. 7 MAX. HEC COUNT |
|---|---|---|---|---|---|---|
| 0 | 0 | 0 | 128 | $\frac{1}{2}$ | −64 | — |
| 1 | 2 | 3 | 125 | $5\frac{1}{3}$ | 16 | 4096 |
| 2 | 3 | 4 | 124 | $5\frac{1}{3}$ | $21\frac{1}{3}$ | 4096 |
| 3 | 5 | 7 | 121 | $5\frac{1}{3}$ | $37\frac{1}{3}$ | 4096 |
| 4 | 8 | 10 | 118 | $5\frac{1}{3}$ | $53\frac{1}{3}$ | 4096 |
| 5 | 11 | 14 | 114 | 4 | 56 | 5120 |
| 6 | 14 | 18 | 110 | 4 | 72 | 5120 |
| 7 | 20 | 26 | 102 | 4 | 104 | 5120 |
| 8 | 26 | 33 | 95 | $2\frac{2}{3}$ | 88 | 6144 |
| 9 | 33 | 42 | 86 | $2\frac{2}{3}$ | 112 | 6144 |
| 10 | 41 | 53 | 75 | $2\frac{2}{3}$ | $141\frac{1}{3}$ | 6144 |
| 11 | 50 | 64 | 64 | 2 | 128 | 8192 |
| 12 | 60 | 80 | 48 | 2 | 160 | 8192 |
| 13 | 72 | 96 | 32 | 2 | 192 | 8192 |
| 14 | 85 | 112 | 16 | 2 | 224 | 8192 |
| 15 | 100 | 128 | 0 | 2 | 256 | 8192 |

It will be recalled that an objective of the present invention is to provide approximate heating element temperature information for each of the heating units without utilizing any type of temperature sensor. To this end a heater energy counter 46 is provided for each heating element which is incremented in such a way that the count of the counter is approximately proportional to the temperature or more fundamentally to the relative energy balance of the heating element.

Counter control means 48 responds to power control means 42 to selectively increment energy counter means 46 at one of a plurality of possible increment rates, each of which is approximately proportional to the rate of increase of the heating element temperature during the transient heat-up phase when the temperature of the heating element is rising to its operating temperature. The particular increment rate selected is determined by the power setting selected. Counter control means 48 is further operative to discontinue incrementing the energy counter 46 when the count of the counter at least equals a selected one of a plurality of maximum counts, each of which is approximately proportional to the steady state heating element operating temperature for corresponding power settings. The mance for the particular heating element. It is to be understood that the particular rates selected depend upon the characteristics of the heating element itself as well as the duty cycle at which it is operating. Thus, rates should be empirically determined for the particular system in which the counter arrangement is to be used.

The information provided by heater energy counter 46 may be useful to the control system for performing a variety of functions. It may be desirable, for instance, to initiate the performance of a certain operating function when a certain operating condition which can be characterized by a certain energy level or temperature level exists. This condition can be detected for purposes of initiating the function by comparing the count of energy counter 46 to an empirically determined reference value. The desired function can then be initiated when the desired relationship is detected between the count and the reference value.

In accordance with one aspect of the invention, indicating means 50 are provided to generate a signal detectable by the operator of the appliance signifying that the temperature of at least one of the heating elements is relatively hot. This is accomplished by comparing the count of heater energy counter 46 to a reference value selected to correspond to a particular temperature above which the heating element is uncomfortably hot to the touch. When the count at least equals this reference value, indicator means 50 generates a warning signal. In the illustrative embodiment, indicator means 50 serves to energize a single indicator light 32, thereby providing visual signal to the user that at least one of the heating elements is relatively hot. It is to be understood that a separate light for each heating element could readily be used as well. Also, other means for indicating a condition such as an audio signal generating means could be similarly employed. A significant advantage of this arrangement is that the indicator light remains on even after the heating element is turned off until the heater energy counter decrements down to the reference value, thereby providing an indication to the operator that the heating element remains hot even though the element has been turned off and is no longer being energized.

The control system illustratively embodying the control arrangement of the present invention to be described hereinafter incorporates the present invention in a more comprehensive power control system which is disclosed in greater detail in commonly-assigned, co-pending U.S. patent application by Payne et al (U.S. Pat. No. 4,443,690) This more comprehensive system also uses the heater energy counter information in implementing certain transient operating modes designated fast-heat and fast-cool. These modes are provided to reduce the time required for the heating element temperature to respond to changes in the power level selection.

Generally speaking, the fast-heat mode is implemented when the power level selection is changed from one power setting which could be either the OFF or a non-OFF setting to a higher power setting. In this mode, the heating element is energized at a power level higher than the newly selected level for a predetermined relatively short period to reduce the response time required for the heating element temperature to rise to the normal operating temperature associated with the new power setting. In order to avoid overshooting the steady state operating temperature for the newly selected power setting, it is not desirable to initiate the fast-heat operating mode when the heating element is already operating at a temperature higher than a certain predetermined fast-heat threshold temperature. Thus, before initiating the fast-heat mode, a check is made to determine if the count of the heater energy counter exceeds a predetermined threshold reference value or count which is approximately proportional to the fast-heat threshold temperature. If not, the fast-heat mode is initiated and power control means 42 proceeds to operate the heating element in the fast-heat mode. If the count exceeds the reference value, the fast-heat mode is not initiated.

Also, it may be desirable not to initiate the fast-heat mode if the power setting selected is such a low setting that operation in the fast-heat mode would cause the heating element temperature to overshoot the desired temperature. To this end, the control system can be arranged to only implement the fast-heat mode when the newly selected power level is higher than a predetermined level above which it can be carried out without overshoot.

The fast-cool mode, generally speaking, is implemented when the power setting selection is changed from one power setting to a lower power setting. In this mode the heating element is energized at a power level lower than the newly selected level for a predetermined period of time to reduce the time required for the heating element temperature to decrease to the lower operating temperature associated with the newly selected power setting. As in the fast-heat mode, there are certain conditions under which it would be undesirable to implement the fast-cool mode. Specifically, when the temperature of the heating element is already below a certain predetermined fast-cool threshold temperature at the time the lower power level setting is selected, operation in the fast-cool mode may cause overshoot, causing the heating element temperature to temporarily drop below the new desired operating temperature. To avoid this form of overshoot, the count of energy counter 46 is again checked, this time to determine if the count is less than a second threshold reference value or count which is approximately proportional to the fast-cool threshold temperature. If the count is less than this second threshold reference value, signifying the heating element is already at a relatively low temperature, the fast-cool mode is not implemented; otherwise, control means 42 proceeds to operate the heating element in the fast-cool mode.

As with the fast-heat mode, it may be desirable not to implement the fast-cool operating mode for power settings above a relatively high setting in order to avoid a temporary drop in the operating temperature below the desired new operating temperature. To this end, the control system may be arranged to only implement the fast-cool operating mode when the newly selected power setting is below a predetermined relatively high power setting below which the fast-cool mode can be implemented without overshoot.

In addition to the fast-heat and fast-cool modes, the exemplary comprehensive control system to be described hereinafter in greater detail provides one additional transient mode, Instant On. However, the counter information is not used in implementing this operating mode. Briefly, the purpose of the Instant On Mode is to provide a relatively quick response when the operator changes the power setting of a heating element from OFF to a non-OFF power setting. Since the total control period is on the order of 17 seconds, it is possible that the operator may select a power setting during the latter stages of the control period in which case a period of several seconds could elapse before any power is applied to the heating element, causing the user to wonder whether or not the power selection is entered. To overcome this problem, the Instant On Mode causes the heating element to be operated at the maximum power setting for a predetermined period of time beginning with the next control interval regardless of the actual power setting selected, so that power is applied to the heating element during the very next control interval regardless of where the system is in the control period when the selection is made.

B. Parameter Selection Considerations

The temperature response of resistive heating elements of the type normally used for cooking apparatus when energized at room temperature generally can be characterized by heating curves comprising a heat-up phase and a steady state phase. When power is decreased or removed completely, the temperature response can be characterized by a cooling-down phase. A family of such curves for a typical heating element used as a surface unit in an electric range is shown in FIG. 4 for various power settings. The heating-up phase is represented by that portion of the curve characterized by a relatively rapid increase in heating element temperature; the steady state phase is represented by that portion of the curve characterized by a relatively constant temperature; and the cool-down phase is represented by that portion of the curve characterized by a relatively rapidly decreasing temperature following deenergization of the heating element. Temperatures shown are those measured at the inside of a cooking pan which is in contact with the heating element. The heating element is at room temperature when it is first energized and the appropriate power level is applied until the steady state temperature is reached. The heating element operates at this steady state level until power is removed at which time the heating element cools down to room temperature. To a first degree of approximation for most conventional cooking utensils, the slopes of the heating curves are independent of load conditions. The approximate response to changes in power settings can be determined from these curves by finding the curve corresponding to the new setting, starting from the temperature point representing the temperature of the element when the setting is changed.

The temperature of a heating element reflects the net energy balance of the heating element. When power is initially applied to the heating element at room temperature energy is being added to the heating element from the power supply at a rate greater than the heating element dissipates the energy through radiation and conduction by heat transfer to the surroundings resulting in a net increase in the energy level of the element. This net increase in energy level results in an increase in the temperature of the heating element. Eventually, the heating element reaches a temperature at which it is dissipating energy at a rate equal to the energy being provided from the power supply, at which time the temperature levels off, and the system operates in its steady state phase or mode. When the heating element is deenergized, the heating element dissipates energy resulting in a temperature decrease until the heating element temperature returns to room temperature.

By incrementing and decrementing a counter at rates which approximate the rates at which the net energy balance of the heating element increases or decreases, the count of the energy counter at any point in time is approximately proportional to the net energy level characterized by a particular temperature. Thus, it is possible to empirically determine a counter increment rate for each power setting which is approximately proportional to the rate of temperature increase or energy increase for the heating element for that particular power setting. By incrementing the counter at that rate when that power setting is selected the count of the counter is approximately proportional to the temperature of the heating element.

Curves 52 and 54 represent thermal curves for power settings 8 and 11, respectively. Curve 56 represents a linearized approximation of the curve for power level 12. The slope of curve portion 56A represents a counter increment rate of 88 counts per control period which is that implemented in the illustrative embodiment for the counter when power level 8 is selected. The horizontal portion 52B of the curve represents the maximum count of the counter for the power level selected, which in the illustrative embodiment is set at 6144 for power level 8, and the slope of portion 56C determines the rate for decrementing counter 46. In the illustrative embodiment, this rate is 64 counts per control period.

One technique for implementing the count of the heater energy counter to approximate the temperature of the heating element being subjected to power control of the type utilizing periodic energization of the heating element would be to increment the counter at a certain rate during each control interval when the heating element is energized and decrement the counter during control intervals when it is deenergized so that during any one control period the counter would be incremented during a certain number of the control intervals and decremented during others, the net result at the end of the control period being a net increase or decrease of the counter relative to the beginning of the control interval. One disadvantage of this approach is that it requires a counter having the capacity to count very large numbers. In a preferred form of the invention, an increment rate is selected which provides the desired net increase in the count at the end of each control period representing the approximate increase in temperature of the heating element during that control period for the duty cycle at which the element is operating. This is carried out by incrementing at a relatively slow rate during energized control intervals and holding the count constant during nonenergized control intervals.

Figure 5:
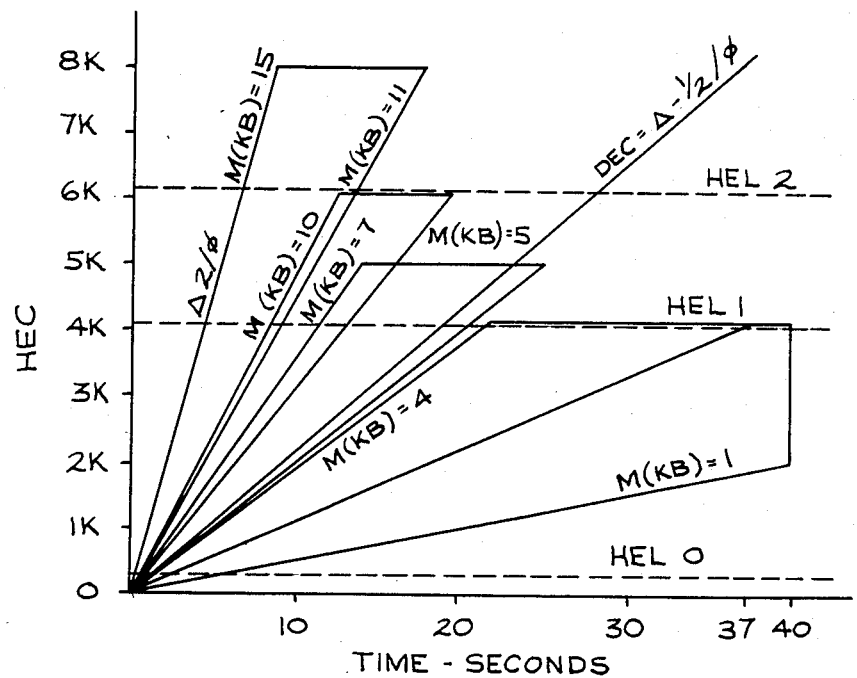
FIG. 5 is a graph depicting the count of the heater energy counter of the control arrangement of FIG. 2 versus time for various power settings.

The graph of FIG. 5 shows the effective increment rates for the various power settings employed in the illustrative embodiment to be described hereinafter. The number of counts which the energy counter is incremented each energized control interval for the various power setttings is shown in TABLE I. It will be noted that the count rate per control interval is higher for the low power settings than for the high power settings. This is done to take into account that the heating element operates more efficiently at low temperatures. That is, energization of the heating element for a given duration of time at low temperature results in a greater increase in temperature than energization of the heating element at a high temperature for the same duration of time. When operating at low settings, the heating element is energized for fewer control intervals per control period and the temperature of the element increases relatively slowly; however, for each energized control interval, the increase in temperature is greater than for the relatively high power setting. At the high power setting, the temperature of the unit increases rapidly to the level at which the temperature increase per control interval is less. Thus, the high rate per interval for low settings and low rate per interval for high settings provides a satisfactory approximation to the actual rate of temperature increase for the various power settings.

As shown in Col. 6 of TABLE I, the effective increment rate per control period does increase with increasing power setting, as would be expected. This difference results from the fact that the number of conductive control intervals per control period increases with an increase in power level. Thus, even though the counter is incremented at fewer counts per conductive control interval, the number of conductive control intervals per control period is much greater for the higher power setting, resulting in a total counter increment rate per control period which increases with increasing power level.

The increment rate per control period is selected to empirically approximate the rate of increase of the heating element temperature for each of the power settings by attempting to linearly approximate the temperature versus time curve for the heating element at each of the power settings. Various approximating techniques could be employed to arrive at the desired increment rate for each power setting, depending upon the degree of accuracy desired. The linear approximations expressed as constant increment rates per control period in TABLE I have been found to provide satisfactory results for the functions performed by the control arrangement of the present invention. It will be observed in the graph of FIG. 5 that there are certain overlaps. This results from a compromise between approximation accuracy and implementation economy. If greater accuracy is desired, rates which are more precisely tailored to each power setting could be empirically determined and readily implemented at the cost of a substantial increase in required microprocessor memory storage capacity.

As mentioned briefly hereinbefore in the form of the invention first to be described, a constant decrement rate is employed for all the power settings. In another form of the invention, a more accurate approach is employed which provides different rates for different power groups and which responds to changes from higher to lower power settings, as well as to the OFF setting; however, the accuracy provided by the single constant rate has been found to provide satisfactory performance in the control arrangement of the present invention. As shown in FIG. 5 and also in in TABLE I, maximum counts are provided for various power settings 1-4 at a maximum count of 4096, settings 5-7 at a maximum count of 5120, settings 8-10 at a maximum count of 6144, and settings 11-15 at a maximum count of 8192. It has been empirically determined that the maximum counts provide satisfactory approximations of the maximum temperature of the heating element. Obviously, a more accurate approximation would result if a different maximum count were used for each individual power setting. Again, the improved performance would require additional memory storage capacity. It was determined, as a practical matter, that the additional programming code required to implement such a scheme was not justified in view of the satisfactory performance obtained by grouping in accordance with that shown in FIG. 5.

The threshold temperatures and corresponding threshold reference values for energizing the hot light indicator and initiating the various transient modes were empirically chosen to provide the desired operating performance. It was determined that it would be desirable to energize the hot light indicating to the user that the heating element was hot when the temperature of the heating element exceeded a temperature of 110° F. This temperature was selected as a reasonable transition temperature between relatively cool and relatively hot settings. Above this temperature, the heating element is at least uncomfortably hot to the touch. The heater energy count empirically found to be approximately proportional to this temperature for the illustrative embodiment is a count of 256. A threshold temperature above which it is undesirable and unnecessary to implement the fast-heat mode because implementation may cause overshoot, has been empirically determined to be 350° F. A threshold count or reference value of 4096 has been found to be approximately proportional to this temperature for the illustrative embodiment. The Fast-Cool threshold temperature below which it is undesirable and unnecessary to implement the Fast-Cool operating mode has been empirically determined to be 500° F. A threshold count for reference value of 6144 has been empirically found to be approximately proportional to this temperature.

C. Functional Operation of the System

Figure 6:
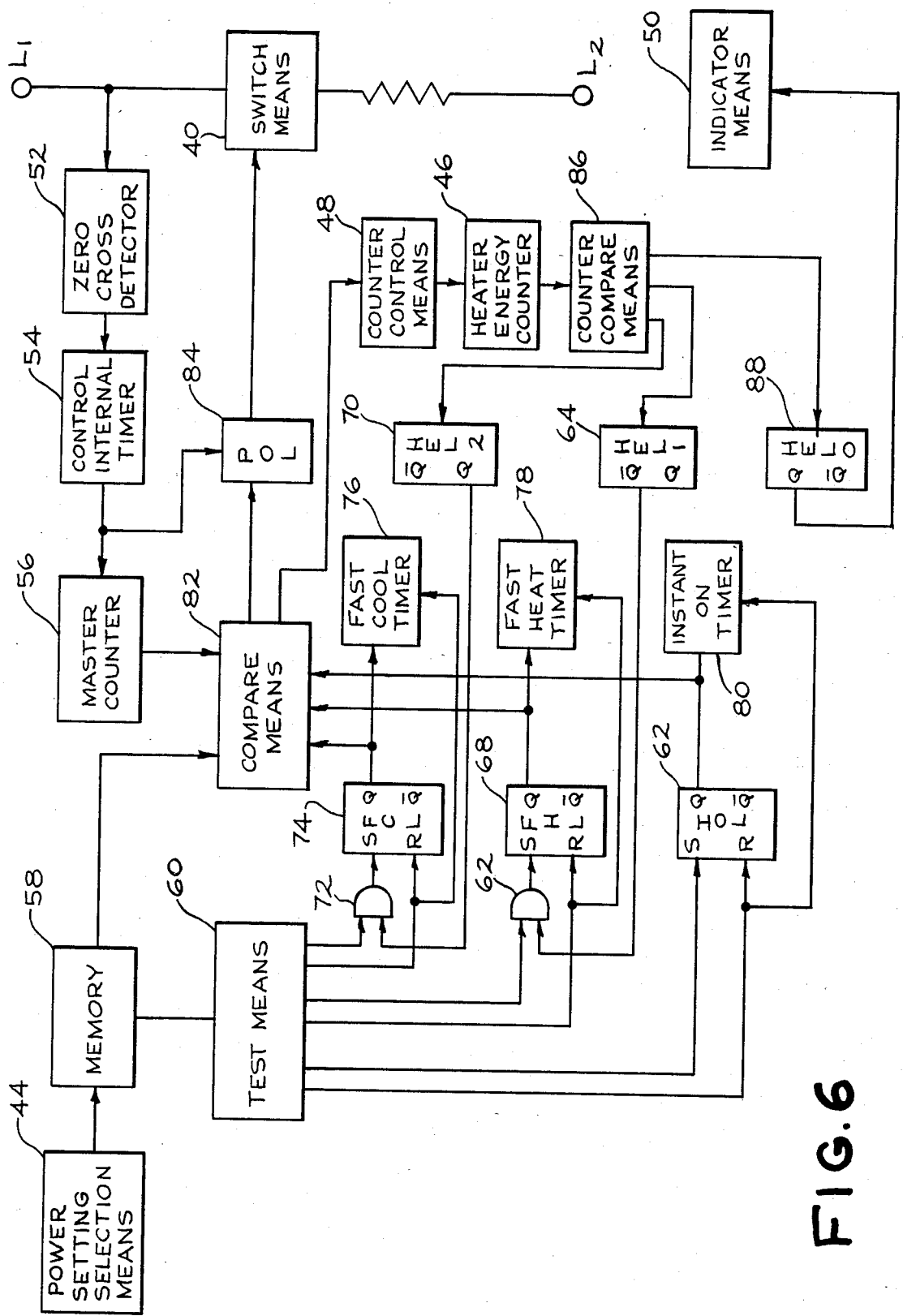
FIG. 6 is a more detailed functional block diagram of the control arrangement of FIG. 2 for a single one of the heating elements.

The functional block diagram of FIG. 6 which illustrates a control system in accordance with the present invention to implement these operating modes for a single heating element, will be referred to in describing in greater detail the functional operation of the control system embodying the temperature monitoring arrangement of the present invention. It is to be understood that the operation of the system is the same for multiple heating elements requiring merely a duplication of the control arrangement shown for each additional heating element.

Control system operation is synchronized with the zero crossings of the power signal applied to terminals L1 and L2. Zero crossing detector 52 monitors the power signal and generates a zero crossing pulse upon each detection of a zero crossing of the power signal. The control interval is defined by control interval timer 54 which counts the zero crossings and generates an output pulse once every eight cycles of the power signal corresponding to once every 16 counts or zero crossings. The output pulse from control interval timer 54 marks the beginning of each control interval. Master Counter 56 establishes the duration of each control period by repetitively counting a predetermined number of control intervals and resetting. In the illustrative embodiment, Master Counter 56 counts from zero to 128 and resets, thereby establishing the duration of the control period at approximately 17 seconds. The control logic is completely cycled through once at the beginning of each control interval during which a switch means triggering decision for each heating element is made for that control interval.

In carrying out the power control scheme, the output from power setting selection means 44 representing the current power level selected by the operator is read into memory 58 at the beginning of each control interval. Memory 58 includes a temporary storage location KB (not shown) and a permanent storage location M(KB) for storing control signal data. The newly entered digital control signal from the power level selection means is stored in temporary location KB, until Test Means 60 completes the testing of this signal in a manner to be described. Upon completion of the testing process, the signal stored at KB is transferred to permanent storage location M(KB) in memory where it is retained indefinitely until replaced by a control signal representing a subsequently selected power setting. In the balance of this description, the designations KB and M(KB) are used interchangeably to refer to the memory locations, as well as the signal stored at these locations, as is customary in the art. In each instance, the meaning will be apparent from the context.

In order to determine when to initiate the transient operating modes, Test Means 60 monitors KB to determine whether the new power setting is an OFF setting, the same setting as the previous setting, or a change in the setting to a higher power level or a lower power level. When the new setting is the same as the original setting, that is, when KB is the same as M(KB), indicating no change in power setting, M(KB) is unchanged and control proceeds accordingly. When a change in power setting from a power level to an OFF setting is detected, KB is read into M(KB) replacing the previously entered setting. When KB is different from M(KB) and is not an OFF setting, further testing on KB is performed to distinguish between an increase in the power setting and a decrease in the power setting in order to initiate the appropriate transient operating mode. Test Means 60 generates output signal for setting and resetting the transient mode controlling latches, namely the Instant On Latch (IOL) 62, the Fast-Heat Latch (FHL) 68 or the Fast-Cool Latch (FCL) 74, in cooperation with Heater Energy Latches 64 and 70 in a manner described in detail in the above-referenced Payne et al disclosure.

Duty cycle control of the heating element is carried out by Comparing Means 82 which compares the count of Master Counter 56 with a digital power signal representing the power setting to be implemented, to determine whether to energize the heating element during the next control interval. This digital power signal digitally represents the actual number of ON control intervals per control period for the power level to be implemented. The number of ON control intervals per control period, represented by the digital power signal for each power setting is shown in Col. 3 of TABLE I. It will be recalled that Master Counter 56 is incremented once each control interval repetitively counting from zero to 127. Comparing Means 82 generates an output signal to set the Power On Latch 84 when the count of Master Counter 56 is less than the digital power signal. Thus, for example, when the heating element is operated at power level 6 the element is to be energized for 18 control intervals during each control period. For power level 6, the power signal is a digital representation of the number 18. During each control period, the count of Master Counter 56 will be less than the power signal for counts zero through 17 corresponding to 18 counts and greater than or equal to the power level signal for the remaining 110 counts of the control period. Thus, the Power On Latch will be set for the first 18 control intervals of each control period.

During steady state operation, the digital power signal represents the actual power level selected, M(KB). However, when one of the transient operating modes is being implemented, Comparing Means 56 substitutes a value for the digital power signal other than that corresponding to the actual power level selection signal. When the Instant On Latch is set, calling for the Instant On operating mode, a digital power signal value of 128 corresponding to the maximum power level setting is substituted for the value representing the actual power level setting. When the Fast-Cool Latch 74 is set, calling for the Fast-Cool operating mode, Comparing Means 56 substitutes a value for the digital power signal corresponding to a power level six levels below the power setting actually selected, or the OFF setting, if the newly selected setting is within six levels of the OFF setting. For example, if the newly selected power setting is power level 8, the actual power level setting signal would be the digital representation of the number 33. However, during operation in the Fast-cool mode, the power signal represents power level 2, i.e., the digital representation of 4. Similarly, when Fast-Heat Latch 68 is set, Comparing Means 82 substitutes a power signal corresponding to the power setting which is six levels higher than the actual selected power setting, or the maximum setting, if the actual power setting is within 6 levels of the maximum power setting. For example, if the newly selected power level setting is power level 8, the power signal corresponding to power level 14 representing the number 112 would be substituted for the power signal representing the actually selected power setting.

As mentioned briefly hereinbefore, the control arrangement of the present invention provides a Heater Energy Counter 46 to indirectly monitor the approximate temperature of the heating element. Counter control means 48 responds to the digital power signal employed by Comparing Means 82 by incrementing Heater Energy Counter 46 at a rate determined by that power signal. Counter control means 48 is operative to discontinue incrementing Heater Energy Counter 46 upon reaching a predetermined maximum count determined by the power setting at which the element is being energized and operated. Counter comparing means 86 is operative to compare the count of Heater Energy Counter 46 to three different predetermined threshold counts corresponding to threshold temperatures.

The first threshold count represents the hot light threshold temperature above which the heating element is uncomfortably hot to the touch. Upon determining that the count of Heater Energy Counter 46 is greater than this first predetermined count, Counter Compare Means 86 generates a signal which sets the Heater Energy Latch, HEL0 88. Setting of HEL0 88 actuates indicator means 50 which provides a signal detectable by the operator that heating element 12 exceeds the first referenced temperature and is thus too hot to touch.

The second threshold count represents the Fast-Heat threshold temperature. It will be recalled that it is desirable not to initiate the Fast-Heat operating mode when the temperature of the heating element is above this temperature, so as to avoid overshooting the operating temperature for the newly selected higher power setting. Upon detecting that the count of Heater Energy Counter 46 exceeds the second count, Counter Compare Means 86 sets HEL1 64. When HEL1 is set, AND gate 66 blocks the Fast-Heat set signal from Test Means 60 to Fast-Heat Latch 68 preventing initiation of the Fast-Heat mode. When HEL1 is in its reset state, gate 66 is enabled and the signal from Test Means 60 is gated to Fast-Heat Latch 68, initiating operation in the Fast-Heat operating mode upon detection of a change from one setting to a higher power setting.

The third threshold count represents the Fast-Cool threshold temperature. It will be recalled that it is desirable not to initiate the Fast-Cool operating mode when the temperature of the heating element is less than this temperature, so as to avoid overshooting the temperature for the newly selected lower power setting. Counter Compare Means 86, upon determining that the count of Counter 46 exceeds this third predetermined count, sets HEL2 70. When HEL2 is set, AND gate 72 gates the Fast-Cool signal from Test Means 60 to Fast-Cool Latch 74, enabling initiation of the Fast-Cool mode, when a decrease in power setting has been detected. Thus, the Fast-Cool Latch can only be set when the count of Heater Energy Counter 46 is greater than the Fast-Cool threshold count.

To demonstrate system operation by example, it will be assumed that the last power setting entered was OFF, the heating element is at room temperature, and the newly selected power setting is power level 10.

When the operator sets rotary knob 22 (FIGS. 1 and 3) at position 10, the signal representing this selection is stored as KB in memory at the beginning of the next control interval Test Means 60 checks KB for an OFF setting. Test Means 60 next checks to determine if the previous setting, now stored at M(KB), was an OFF setting. Upon determining that the new signal is one of power settings 1-15 and that the previous setting was an OFF setting, Test Means 60 proceeds to set the Instant On Latch 62 so as to initiate the Instant On operating mode. Compare Means 82 responds by implementing power setting 15. Comparing Means 82 continues to operate in this fashion for a predetermined period on the order of 4.3 seconds until Instant On Timer 76 times out, resetting Instant On Latch 62, thereby terminating the Instant On operating mode.

During operation in the Instant On Mode, Heater Energy Counter 46 is incremented at a rate of 2 counts per energized control interval (TABLE I). At power level 15, the heating element is energized every control interval. Thus the total counter increment rate is 256 counts per control period. For an Instant On Mode of roughly 4.3 seconds duration, corresponding to approximately $\frac{1}{4}$ of a control period, the Heater Energy Counter 46 is incremented 64 counts while operating in the Instant On Mode. HEL1, which prevents operation in the Fast-Heat Mode when set, is set at a count of 4096. Thus, in the present example, upon completion of the Instant On mode, HEL1 is not yet set, so the Fast-Heat Mode is implemented. It should be noted that, had the element not yet cooled down sufficiently to reset HEL1 from previous operation during which the element had been hot enough to set HEL1, the Fast-Heat Mode would not be implemented. As previously hereinbefore described, in the Fast-Heat Mode the element is energized at six levels above the actual power setting or at level 15 if the actual setting is 9 or above. Thus, in the present example, the element continues to be energized at power level 15 for the duration of the Fast-Heat Mode. The Fast-Heat Mode continues for approximately 17 seconds. Since, during operation in the Fast-Heat Mode for power setting 10, the element is operated at power setting 15, Heater Counter 46 continues to be incremented at a rate of 2 counts per control interval. Thus, the Heater Energy Counter is incremented 256 counts from 64 to 320 during operation in the Fast-Heat Mode. At the end of the Fast-Heat Mode, steady state operation at the selected power settings is initiated.

Before describing steady state operation, it should be noted that, in this example, the Hotlight becomes energized during the Fast-Heat Mode. As previously mentioned, Counter Compare Means 86 sets Heater Energy Latch HEL0 at a count of 256 representing the Hotlight threshold temperature of 110° F. In this example, the count would reach 256 after approximately 17 seconds have elapsed, at which time HEL0 is set, thereby causing the indicator light 32 to be energized. Light 32 remains energized as long as the count of Counter 46 exceeds 256.

During steady state operation, Comparing Means 82 implements power setting 10 providing a duty cycle of 41% by energizing heating element 12 for the first 18 control intervals of each control period (TABLE I). Upon reverting to operation at the selected power level, level 10, Heater a Energy Counter 46 is incremented at a rate of $2\frac{3}{8}$ counts per energized control interval. At power level 10, the heating element is energized for 53 control intervals per control period. Thus, the Heater Energy Counter is incremented at a rate of $141\frac{1}{3}$ counts per control period. Heater Energy Counter 46 continues to be incremented during each energized control interval until reaching the maximum count for power level 10 of 6144, at which time Counter Control Means 48 discontinues incrementing Heater Energy Counter 46. The count remains at that level until either a power setting having a higher threshold count is selected, or until the OFF setting is selected. If a higher setting is selected, the counter is incremented at the rate associated with the new setting until the corresponding new threshold is reached, at which count further incrementing is discontinued.

On selection of the OFF setting, Test Means 60 determines that the OFF setting has been selected, the new setting is then shifted from KB to M(KB), Comparing Means 42 implements the zero duty cycle corresponding to the OFF power setting, and Counter Control Means 48 in response thereto begins to decrement Heater Energy Counter 46 at a rate of $\frac{1}{2}$ count per control interval for a total rate of 64 counts per control period. The Heater Energy Latches are reset as the Heater Energy Counter is decremented down. Heater Energy Latch HEL0 remains set until the count decrements down below the count of 256, thereby signifying to the operator that the heating element remains too hot to touch even though the element is no longer being energized. The rate of decrementing the Heater Energy Counter 46 approximates the rate of cooling of the heating element. Thus, the heater energy light remains energized until the temperature of the heating element has lowered to a safe level. In the present example, It will require approximately 26 minutes for the count of Heater Energy Counter 46 to decrement down from the count of 6144 to the level at which the Heater Energy Latch HEL0, which controls energization of the hot light, is reset, thereby deenergizing the Hotlight.

D. Microprocessor Implementation

Figure 7:
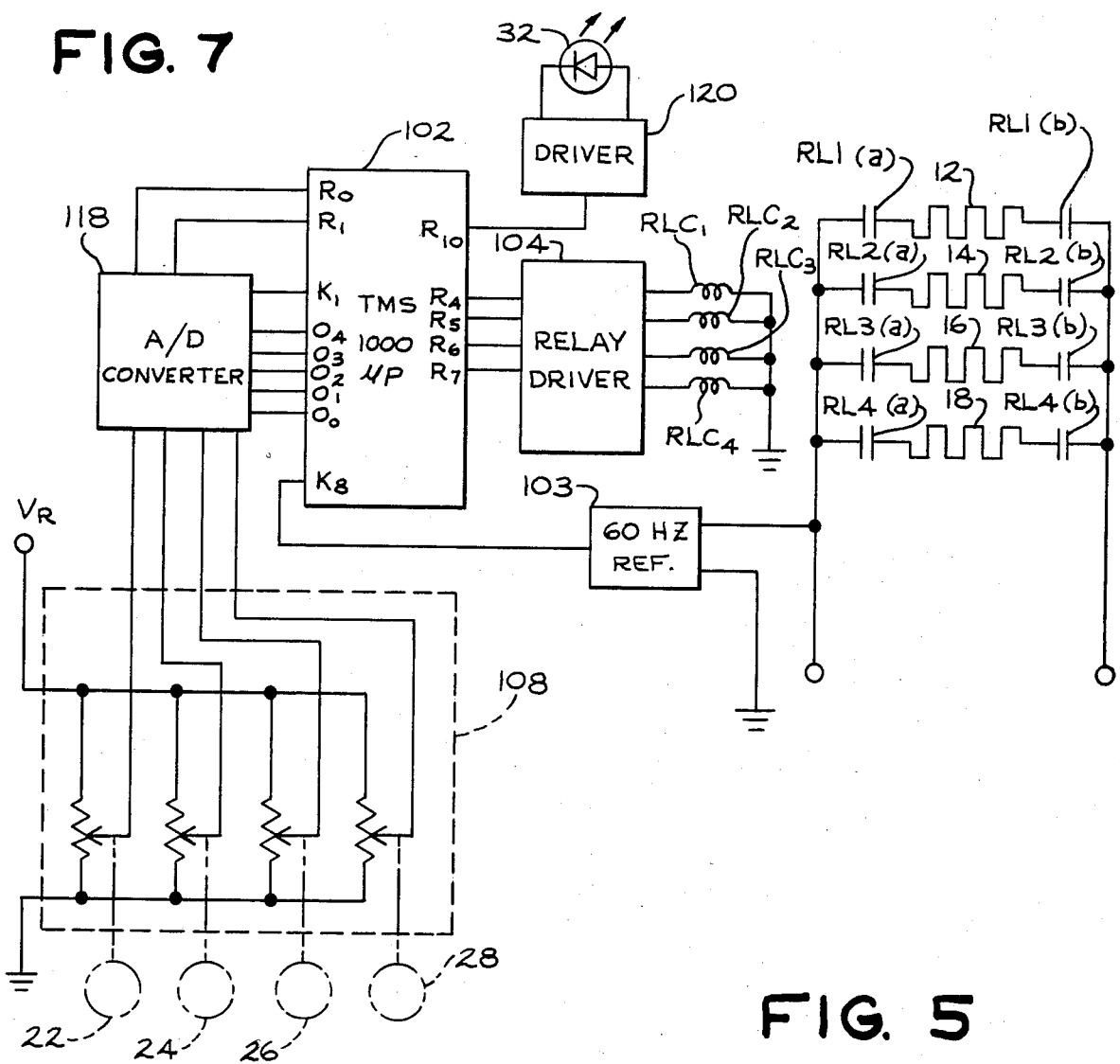
FIG. 7 is a simplified schematic diagram of a control circuit illustratively embodying a control arrangement incorporating the temperature monitoring arrangement of the present invention.

Referring now to FIG. 7, there is shown in simplified schematic form a microprocessor based control circuit which illustratively embodies the temperature monitoring arrangement of the present invention incorporated within a more comprehensive control system. Power to heating elements 12, 14, 16 and 18 is provided by application of a standard 60 Hz AC power signal of either 120 or 240 volts across terminals L1 and L2. Heating elements 12, 14, 16 and 18 are arranged in an electrical parallel fashion across lines L1 and L2 via an array of relays RL1, RL2, RL3 and RL4, each having two sets of contacts (a) and (b) connected between the heating element and lines L1 and L2, respectively, for elements 12, 14, 16 and 18, respectively.

Control signals for opening and closing relays RL1-RL4 are provided by microprocessor 102. A 60 Hz signal is generated by a conventional zero crossing detector 103 and applied to microprocessor input port K8 for purposes of synchronizing system operation with zero crossings of the power signal applied across terminals L1 and L2. Relay control signals from output ports R4-R7 are coupled to relay coils RLC1 through RLC4 of relays RL1-RL4, respectively, by relay driver network 104. These control signals are generated by microprocessor 102 in accordance with the power level selected by the user in a manner to be described hereinafter.

Means for enabling the operator to select the desired power level for each of the heating elements 12, 14, 16 and 18 is provided by power level selection means designated generally 108. Power level selection switch means 108 comprises a set of four potentiometers 110-116 connected in parallel, for controlling of heating element 12, 14, 16 and 18, respectively. A constant reference voltage is applied across the potentiometers 110-116. Wiper arms 110(a), 112(a), 114(a) and 116(a) for potentiometer 110-116, respectively, are positioned in accordance with the power settings selected by operator manipulation of the corresponding ones of control knobs 22-28. Conventional analog to digital converter means 118 scans the setting from each of potentiometers 110-116 to provide a digital input signal to microprocessor 102 representing the power level selected for each heating element. Scanning signals are output from microprocessor 102 at output ports $O_0$ through $O_4$. The power level signal is input to microprocessor 102 at input port K1. Signal light 32 comprises a conventional light-emitting diode (LED) which is coupled to output port $R_{10}$ of microprocessor 102 by a conventional LED driver circuit 120.

Microprocessor 102 of the circuit of FIG. 7 is a TMS 1000 series microprocessor. Technical details concerning the general characteristics of microprocessor 102 are available in a Texas Instruments, Inc. publication entitled, "TMS 1000 Series Data Manual," published in December 1975.

D.1 Control Program

Microprocessor 102 is customized to perform the control functions of this invention by permanently configuring the ROM of the microprocessor to implement predetermined control instructions. FIGS. 8-21 are flow diagrams which illustrate the control routines incorporated in the control program of microprocessor 102 to perform the control functions in accordance with the present invention. From these diagrams, one of ordinary skill in the programming art can prepare a set of instructions for permanent storage in the ROM of microprocessor 102. For the sake of simplicity and brevity, the control routines to follow will be described with respect to the control of heating element 12. It should be understood that for the control system of FIG. 1 the routines are executed once for each of heating elements 12-18 during each control interval. It should be further understood that in addition to the control functions of the present control arrangement there may be other control functions to be performed in conjunction with other operating characteristics of the appliance. Instructions for carrying out the routines described in the diagrams may be interleaved with instructions and routines for other control functions which are not part of the present invention.

The control program consists of a sequence of routines illustrated in the flow diagrams. The control program is cycled through once each control interval for each heating element. It should be noted that the control circuit is continually energized while the apparatus is plugged in regardless of the power setting selected. A description of each routine with reference to the flow diagram follows.

Figure 8:
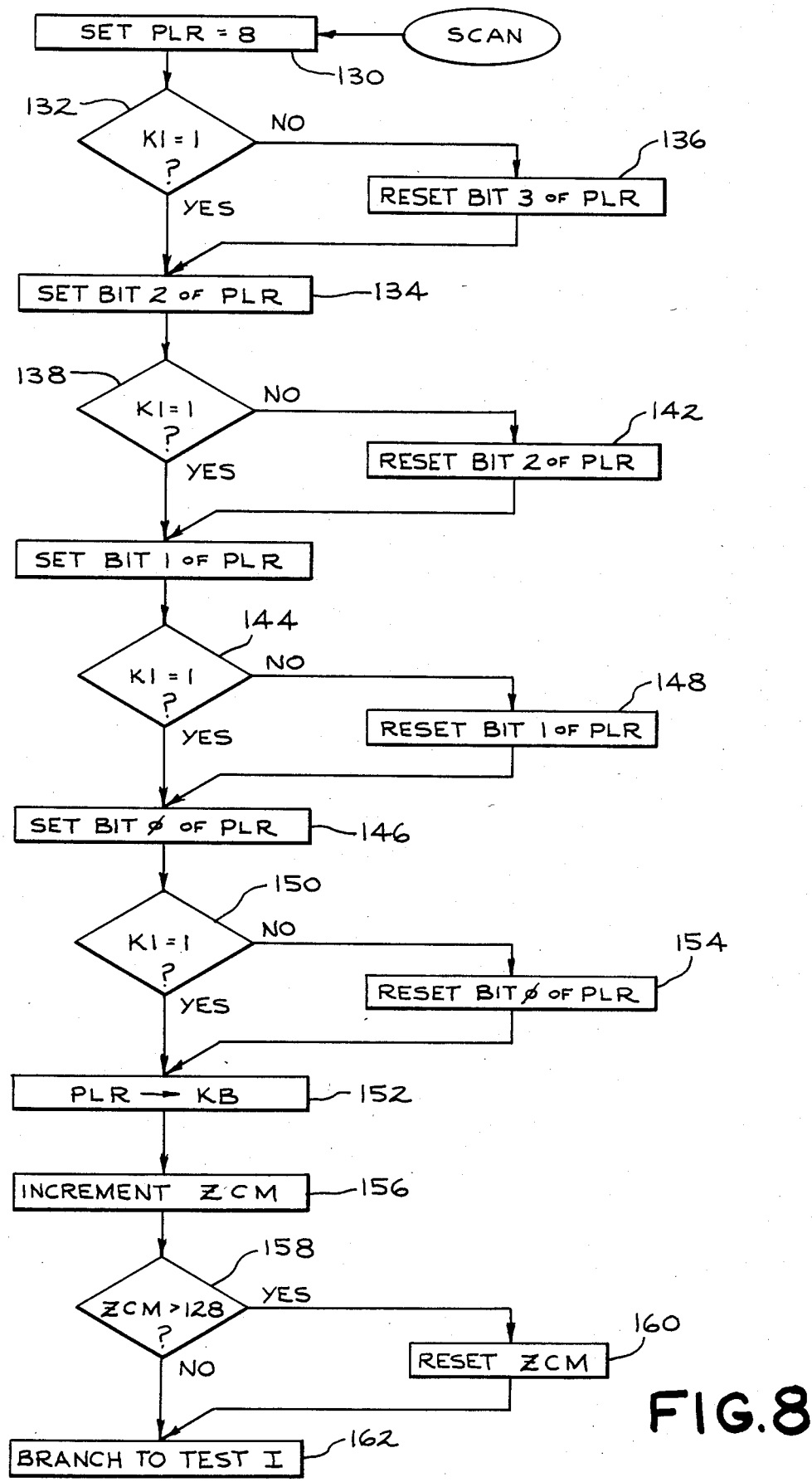
FIG. 8 is a flow diagram of the SCAN routine incorporated in the control program for the microprocessor in the circuit of FIG. 7.

(a) SCAN ROUTINE—FIG. 8

The function of this routine is to scan the operator controlled input potentiometers to determine the power setting selected for each of the heating elements. During execution of this routine for a particular heating element, the potentiometer associated with that heating element is scanned.

It will be recalled that there are 16 possible power settings represented by digital signals corresponding to the number of the settings from 0-15. In this routine, PLR is a 4-bit digital word which sets the reference voltage in the A/D conversion scheme via a resistive ladder network portion of A/D converter 118. PLR is varied in accordance with a successive approximation technique and the voltage generated in the A/D converter is then compared to the voltage across the corresponding one of operator adjustable potentiometers 110-116 to determine the power level selected.

The search starts in the middle with PLR equal to eight (PLR—1000) (Block 130). Inquiry 132 determines if the operator selected power setting is higher (K1=1) or lower (K1=0). If higher, PLR is set equal to 12 by setting Bit 2 (PLR—1010) (Block 134). If lower, PLR is set equal to 4 by resetting Bit 3 (Block 136) and setting Bit 2 (Block 134) (PLR—0010).

Inquiry 138 determines if the setting is higher or lower than the present PLR. If higher (K1=1) the PLR is increased by 2 by setting Bit 1 (Block 140). If lower (K1=0) PLR is decreased by 2 by resetting Bit 2 (Block 142) and setting Bit 1.

Inquiry 144 determines whether the present value of PLR is higher or lower than the reference. If higher, PLR is increased by 1 by setting Bit 0 (Block 146). If lower, PLR is decreased by 1 by resetting Bit 1 (Block 148).

Inquiry 150 repeats the higher or lower test on the selected value. If higher, PLR is read into KB (Block 152). If lower, PLR is reduced by 1, by resetting Bit 0 (Block 154) and then PLR is read into KB (Block 152).

The Master Counter (ZCM) is incremented (Block 156). The ZCM count is checked by inquiry 158. If greater than 128, ZCM is reset (Block 160). The program then branches (Block 162) to the Input Test Routine, FIG. 9.

Figure 9:
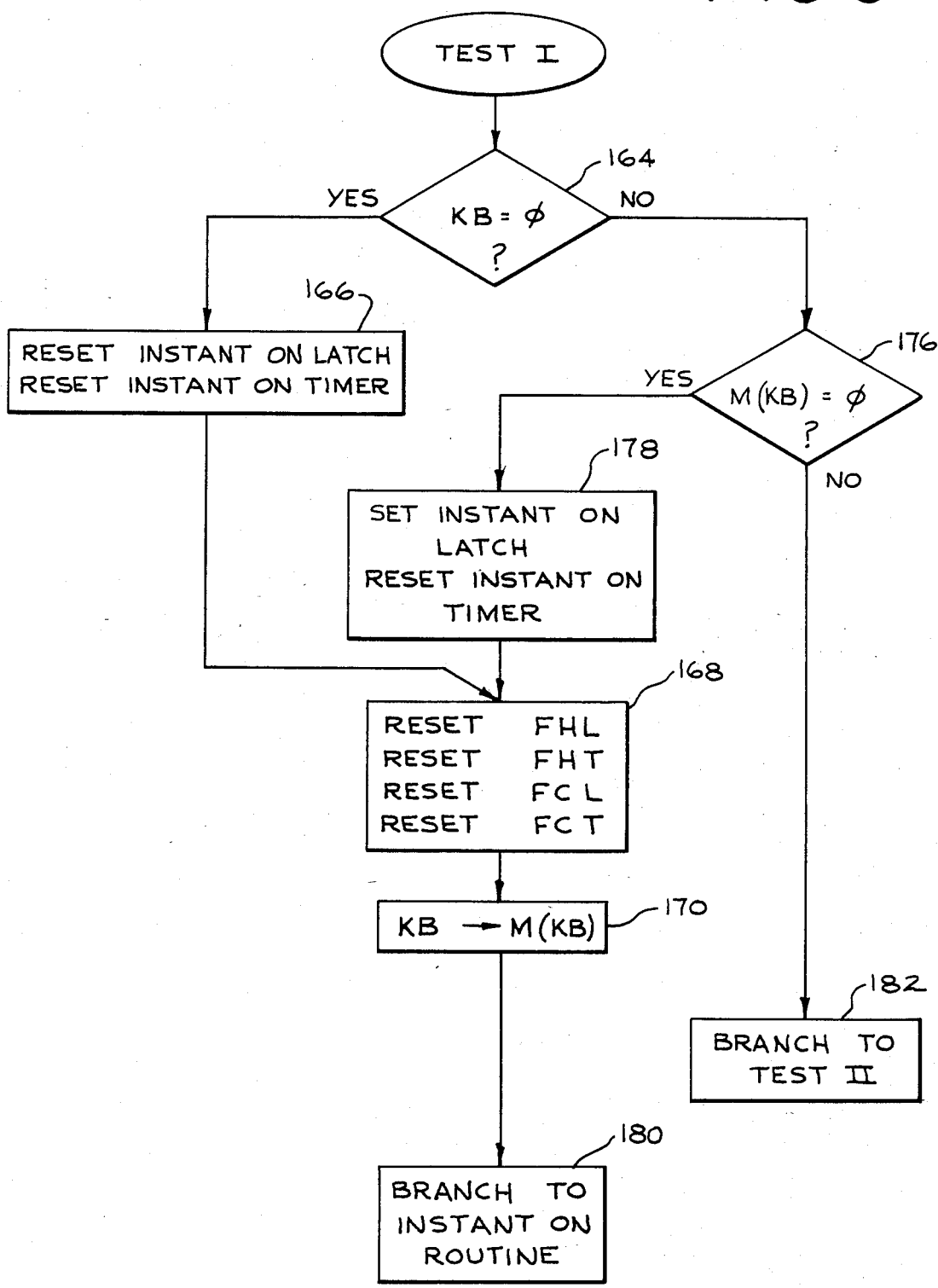
FIG. 9 is a flow diagram of the TEST I routine incorporated in the control program for the microprocessor in the circuit of FIG. 7.
Figure 10:
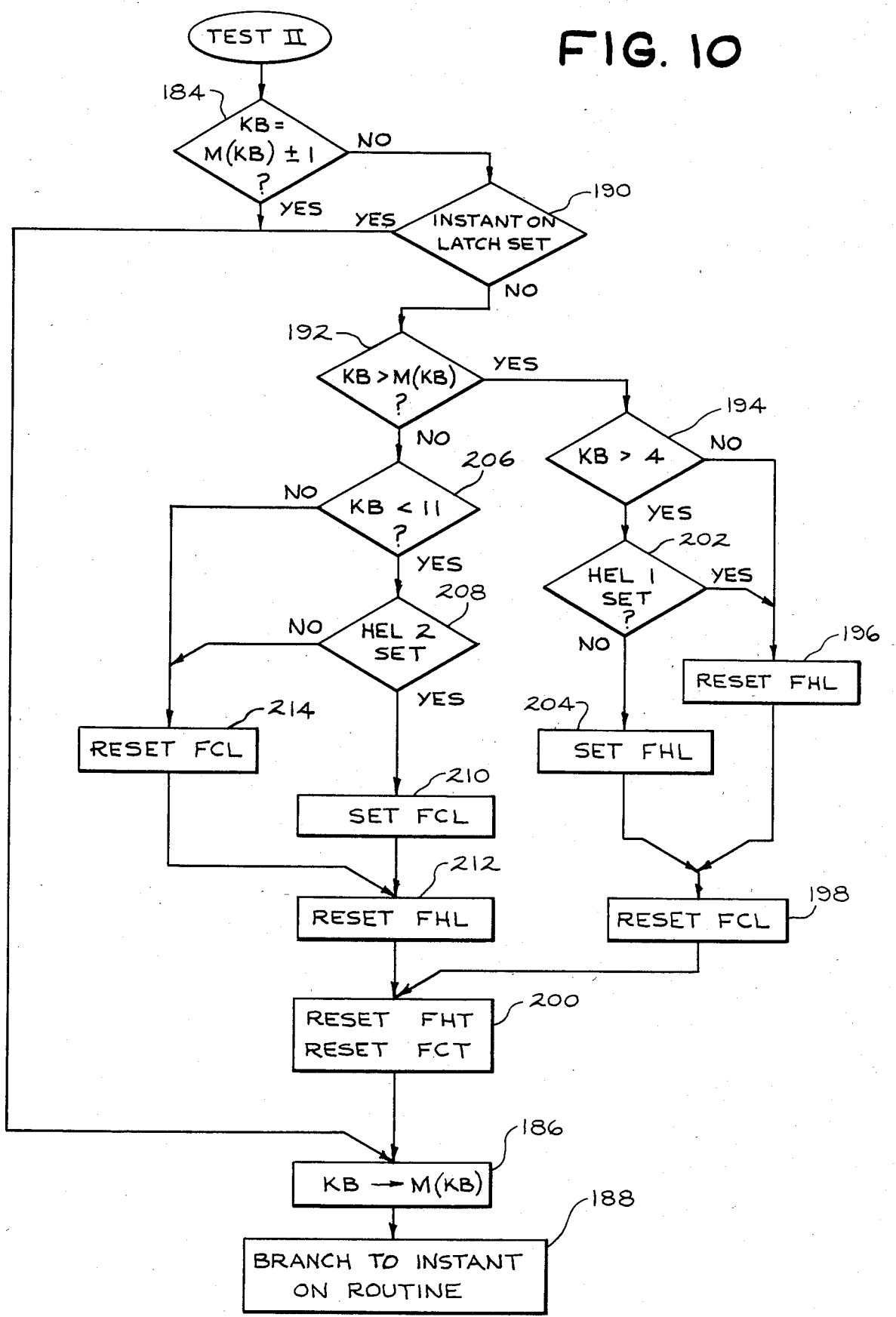
FIG. 10 is a flow diagram of the TEST II routine incorporated in the control program of the microprocessor in the circuit of FIG. 7.

(b) INPUT TEST ROUTINE—FIGS. 9 and 10

This routine essentially performs the function of Test Means 60 of FIG. 6, comparing KB with M(KB) to determine which, if any, of the transient modes should be initiated, and appropriately setting the Instant On, Fast-Heat or Fast-Cool Latches.

Inquiry 164 determines whether KB is an OFF selection or a power setting selection. If Off, the Instant On Latch and Instant On Timer are reset (Block 166) and the Fast-Heat Latch, Fast-Cool Latch and associated timers are all reset (Block 168). KB is transferred into permanent memory as M(KB) (Block 170). If KB is not an OFF setting, Inquiry 176 determines whether KB represents a change from an OFF setting to a power setting by checking the previous setting M(KB) for an OFF setting. If M(KB) is an OFF setting, the Instant On Latch is set, and the Instant On Timer is reset (Block 178). The Fast-Heat and Fast-Cool latches and timers are reset (Block 168) and KB is shifted into M(KB) (Block 170), and the program branches (Block 180) to the Instant On Routine, FIG. 11. If KB does not represent a change from OFF to a power setting, the program proceeds to the Test II Routine (FIG. 10) to perform further tests on KB (Block 182).

Inquiry 184 determines whether the new setting is within one power level of the old setting. If it is, the new setting is shifted into permanent memory (Block 186), and the program branches to the Instant On Routine (Block 188). This in effect treats changes of only one level as if no change occurred for purposes of implementing any of the transient modes since the change is not great enough to need the transient modes to speed the response of the heating unit.

If a new setting is more than one power level higher or lower than the previous setting, Inquiry 190 checks the state of the Instant On Latch. If it is set, signifying that the Instant On mode is in progress, no further testing is performed. KB is shifted into M(KB) (Block 186) and the program branches (Block 188) to the Instant On Routine, FIG. 11. If the Instant On Latch is not set, Inquiry 192 determines whether the new setting is greater than or less than the old setting.

If the new setting represents an increased power setting, Inquiry 194 determines if this increase in power setting is to a power setting greater than reference power level 4. If not, the Fast-Heat Latch, Fast-Cool Latch, and associated timers (Blocks 196, 198, and 200) are reset, the new setting KB is read into M(KB) (Block 186) and the program branches (Block 188) to the Instant On Routine, FIG. 11. This test for KB 4 is implemented because it is undesirable to implement the Fast-Heat Routine even though a power level increase has been selected if the new power setting is not higher than power level 4, since operation of the Fast-Heat mode for power settings lower than 5 could result in a temporary overshoot of the desired operating temperature. If the new power setting is 5 or higher, a check is made of HEL1 (Inquiry 202) to determine whether the heating element temperature is already above the predetermined Fast-Heat threshold temperature. If it is, the Fast-Heat Latch is reset (Block 196) and the program proceeds without implementing the Fast-Heat mode since the heating element is already above the threshold temperature. However, if HEL1 is not set, indicating that the heating element has not yet reached the fast-heat threshold temperature, the Fast-Heat Latch (FHL) is set (Block 204) the Fast-Cool Latch is reset (Block 198), the timers are reset (Block 200), the new setting is stored in memory (Block 186), and the program branches (Block 188) to the Instant On Routine, FIG. 11.

If Inquiry 192 determines that the new power setting is less than the old power setting, Inquiry 206 determines whether the new setting is less than reference power level 11. If yes, Latch HEL2 is checked by Inquiry 208 to determine if the heating element is operating above the threshold temperature for the Fast-Cool mode. If yes, the Fast-Cool Latch (FCL) is set (Block 210), FHL is reset (Block 212), the timers are reset (Block 200), the new power setting is transferred into permanent memory (Block 186), and the program branches (Block 188) to the Instant On Routine, FIG. 11. If the new setting is power level 11 or higher (No to Inquiry 206), the new setting represents a change either from power level 15 to power level 11, 12 or 13, or from power level 14 to power level 12 or 11, or from power level 13 to power level 11. Any of these changes are from a high power level to another relatively high power level and the Fast-Cool mode is unnecessary and may cause the operating temperature to temporarily drop below the desired new operating temperature. Also, even though the new power setting is less than power level 11, if HEL2 is not set (No to Inquiry 208) indicating that the current temperature of the heating element has not yet risen above the Fast-Cool threshold temperature, it is also undesirable to implement the Fast-Cool mode of operation. Thus, under any of these conditions, the Fast-Cool Latch is reset (Block 214), the Fast-Heat Latch is reset (Block 212), the new power level is read into the permanent memory M(KB) (Block 186), and the program branches (Block 188) to the Instant On Routine, FIG. 11.

Figure 11:
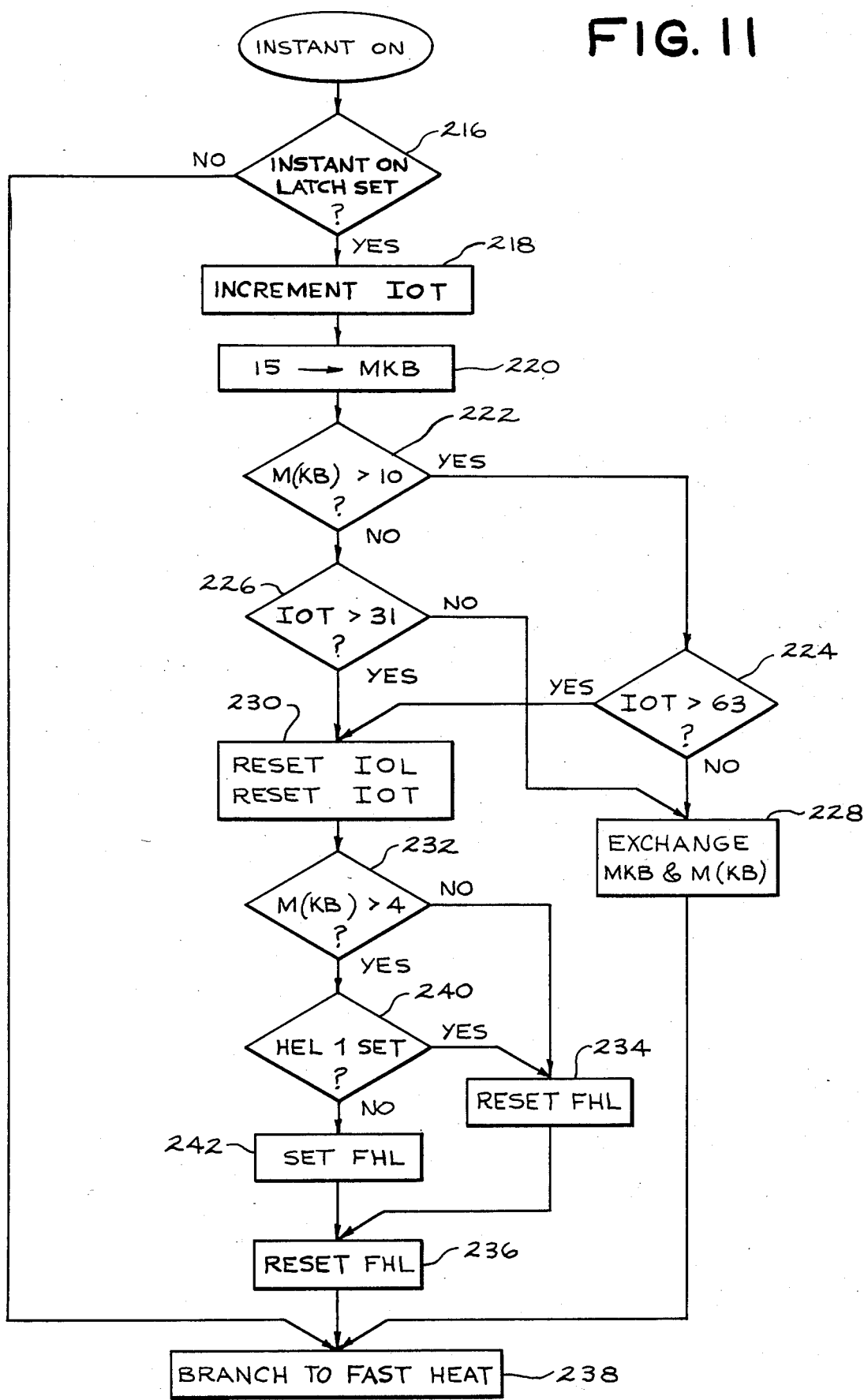
FIG. 11 is a flow diagram of the INSTANT ON routine incorporated in the control program of the microprocessor in the circuit of FIG. 7.

(c) INSTANT ON ROUTINE—FIG. 11

This routine performs one function of compare means 82 of FIG. 6 in implementing operation in the Instant On mode by substituting the signal representing the maximum power setting for the actual power setting when the Instant On Latch is set and also performs the timing function of Instant On Timer 80 of FIG. 4 to control the duration of operation in the Instant On mode.

Inquiry 216 determines whether or not the Instant On Latch has been set. If not, the program branches (Block 238) to the Fast-Heat Routine, FIG. 12. If it has been set, indicating that there has been a change from OFF to a power setting, the Instant On Timer is incremented (Block 218) and a signal representing power level 15 is stored in memory location MKB (Block 220). In implementing the Instant On mode, one single duration for this operating mode could be utilized. However, in the illustrative embodiment, the microprocessor is programmed to establish one duration for power settings greater than 10 and a shorter duration for power settings less than 10. The longer duration for the higher power settings enables them to get to the desired operating temperature more rapidly. A shorter duration for the lower power settings avoids overshoot which might occur as a result if the longer duration were used for all power settings. Inquiry 222 determines whether the new power setting is greater or less than 10. If greater than 10, Inquiry 224 controls the duration by resetting the Instant On Latch to end the Instant On operating mode when the count of the Instant On Timer (IOT) is greater than 63 corresponding to a time of approximately 8.4 seconds. If the power level is 10 or less, Inquiry 226 controls the duration of the Instant On operating mode by resetting when the Instant On Timer (IOT) count is greater than 31 corresponding to approximately 4.2 seconds. If the Instant On Timer has not timed out, the signal stored at MKB representing power level 15 is exchanged with that stored at M(KB) representing the actual power setting selected by the user, so that the M(KB) now represents the maximum power level setting (Block 228).

Once the Instant On Timer times out, the Instant On Latch (IOL) and timer IOT are reset (Block 230), Inquiry 232 determines if the power setting is greater than 4. If not, the Fast-Heat Latch is reset (Block 234) the Fast-Cool Latch is reset (Block 236), and the program branches (Block 238) to the Fast-Heat routine FIG. 12. If the selected power level is greater than 4, the state of HEL1 is checked (Inquiry 240) to determine whether the count of the Heater Energy Counter has indicated a heating element temperature greater than the Fast-Heat threshold temperature. If the HEL1 is set, indicating that the threshold temperature has been exceeded, the Fast-Heat Latch (FHL) is reset (Block 234), the Fast-Cool Latch is reset (Block 236) and the program branches (Block 238) to the Fast-Heat Routine, FIG. 12. If HEL1 is not set, indicating that the heating element has not yet reached the threshold temperature, the Fast-Heat Latch (FHL) is set (Block 242), the Fast-Cool Latch is reset (Block 236), and the program branches (Block 238) to the Fast-Heat Routine, FIG. 12.

Figure 12:
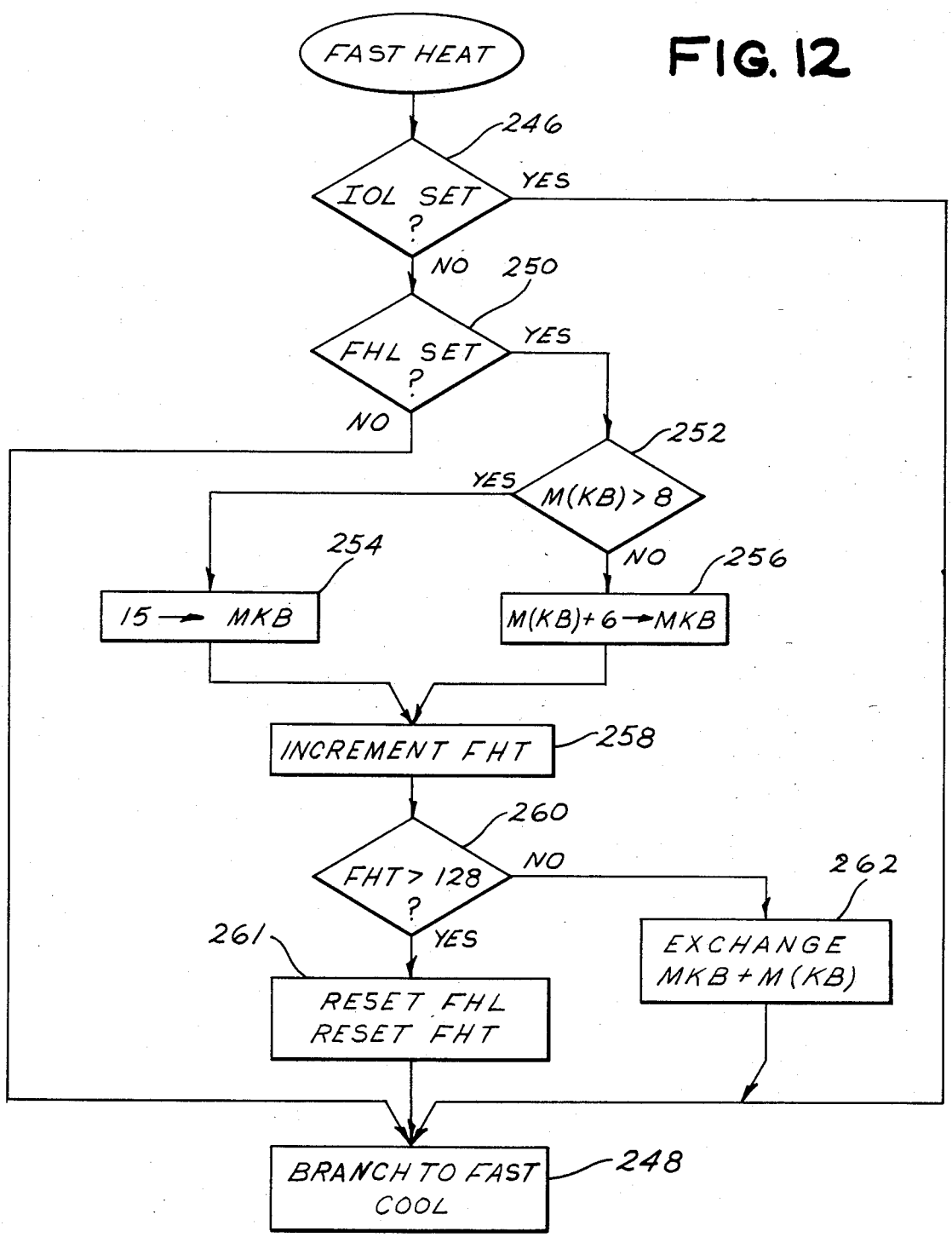
FIG. 12 is a flow diagram of the FAST-HEAT routine incorporated in the control program of the microprocessor in the circuit of FIG. 7.

(d) FAST-HEAT ROUTINE—FIG. 12

This routine performs another of the functions of comparing means 82 of FIG. 6 by implementing operation in the Fast-Heat mode. A signal representing a power level higher than the selected power level is substituted for the selected level signal for the duration of the Fast-Heat mode. This routine also performs the timing function of Fast-Heat Timer 76 of FIG. 6.

Inquiry 246 determines whether the Instant On Latch has been set. If yes, the program branches (Block 248) immediately to the Fast-Cool Routine FIG. 13. If no, Inquiry 250 determines if the Fast-Heat Latch has been set. If yes, Inquiry 252 determines if the power setting is level 9 or higher. If yes, power level 15 is substituted for MKB (Block 254), since the selected level is within 6 levels higher than the maximum level; if not, a signal representing 6 levels higher than the current power setting is stored at MKB (Block 256). Blocks 258 and Inquiry 260 function as a Fast-Heat Timer to terminate the Fast-Heat operating mode by resetting the Fast-Heat Latch (FHL) and timer FHT (Block 261) when the count of the fast-heat timer is greater than 128 corresponding to a total duration of approximately 17 seconds. If the fast-heat timer has not timed out (No at Inquiry 260), the signals stored at MKB and M(KB) are exchanged (Block 262), causing M(KB) to represent the Fast-Heat mode setting. The program branches (Block 248) to the Fast-Cool routine FIG. 13.

Figure 13:
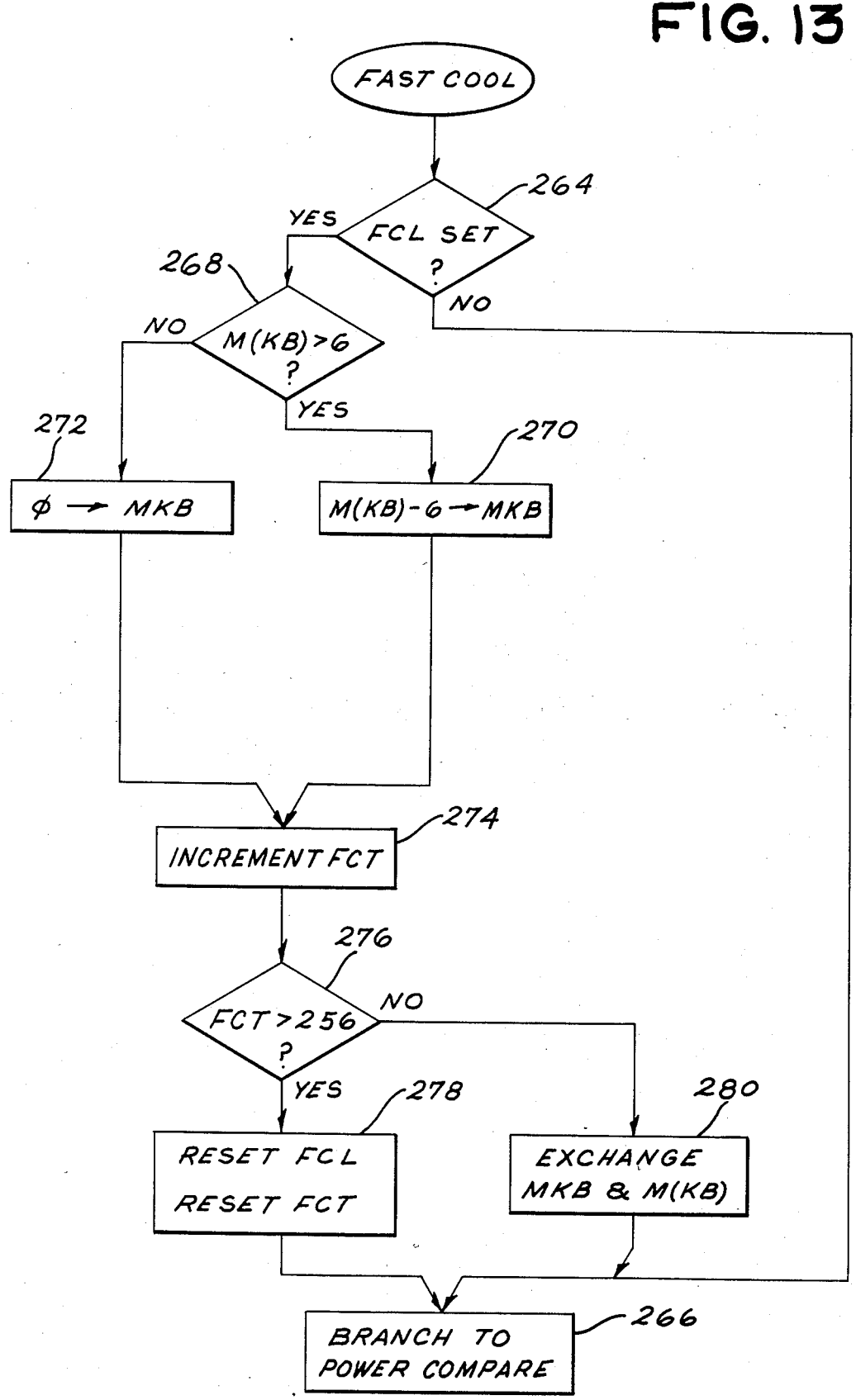
FIG. 13 is a flow diagram of the FAST-COOL routine incorporated in the control program of the microprocessor in the circuit of FIG. 7.

(e) FAST-COOL ROUTINE—FIG. 13

This routine performs another of the functions of comparing means 82 of FIG. 6, by implementing operation in the Fast-Cool mode when the Fast-Cool Latch is set. A signal representing a power setting lower than the actually selected setting is substituted for the signal representing the selected setting for the duration of the Fast-Cool mode. This routine also performs the timing function of Fast-Cool Timer 78 of FIG. 4.

Inquiry 264 checks the state of the Fast-Cool Latch (FCL). If not set, this indicates that the system is not operating in the Fast-Cool mode and the program branches to the Power Compare Routine (Block 266). If the Fast-Cool Latch is set, indicating operation in the Fast-Cool mode is desired, Inquiry 268 determines whether M(KB) is power level 6 or above. If yes, the power signal corresponding to the power setting six levels below the current power setting is stored at MKB (Block 270); if the power setting is less than 6, the power signal (0) corresponding to OFF is stored at MKB (Block 272). Block 274 and Inquiry 276 function as the Fast-Cool Timer (FCT), FCT is incremented (Block 274), then the count of the timer is compared to 256 (Inquiry 276) corresponding to a time of 34 seconds. If timed out, the FCL and FCT are reset (Block 278), and the program branches (Block 266) to the Power Compare Routine, FIG. 14. If FCT is not timed out, the signal stored at MKB is exchanged with M(KB) (Block 280) to substitute the artificially low power setting for the actual power setting for operation in the Fast-Cool mode. Then the program branches (Block 266) to the Power Compare Routine, FIG. 14.

Figure 14:
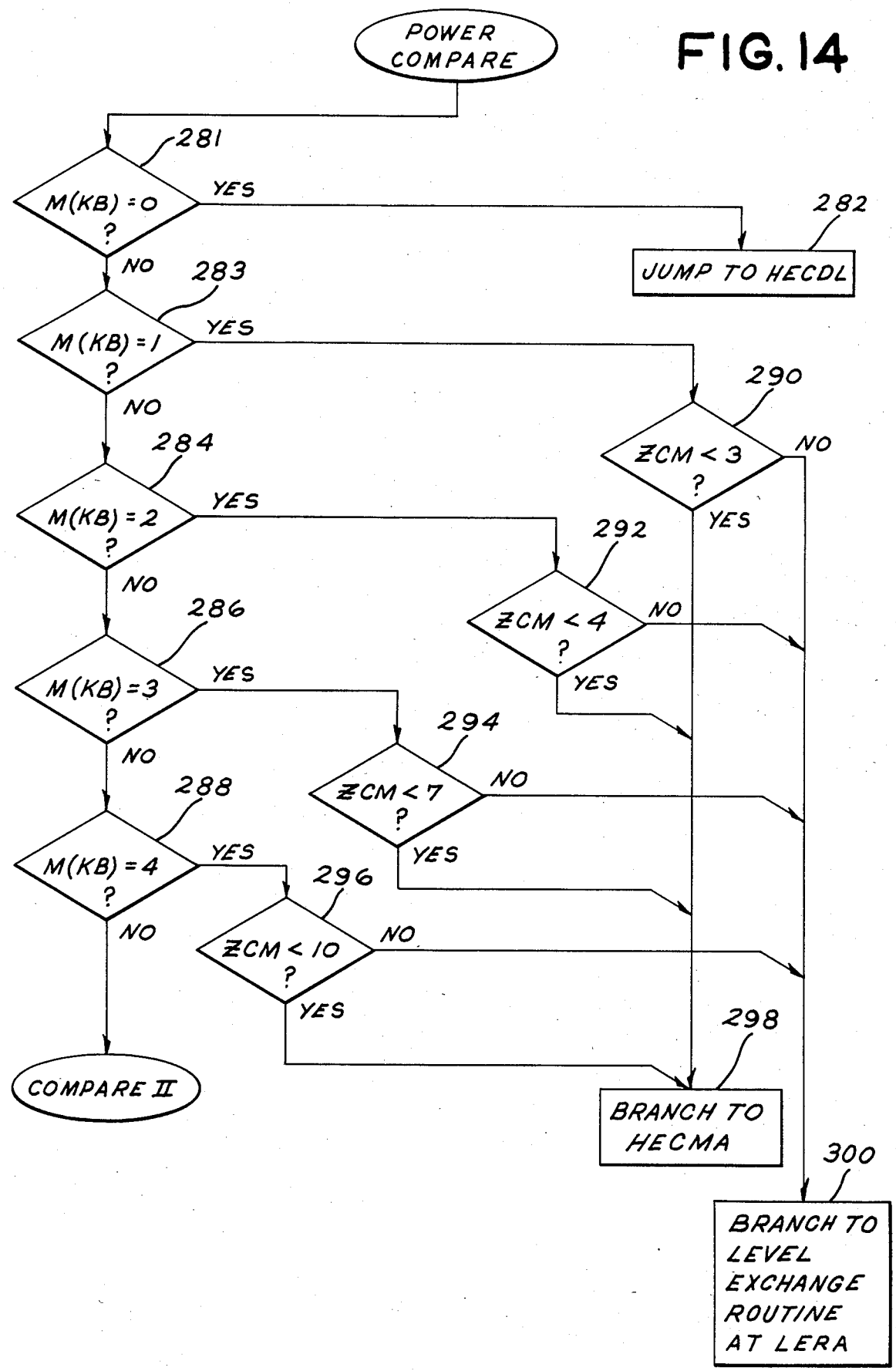
FIGS. 14–16 depict the flow diagram of the POWER COMPARE routine incorporated in the control program of the microprocessor in the circuit of FIG. 7.
Figure 15:
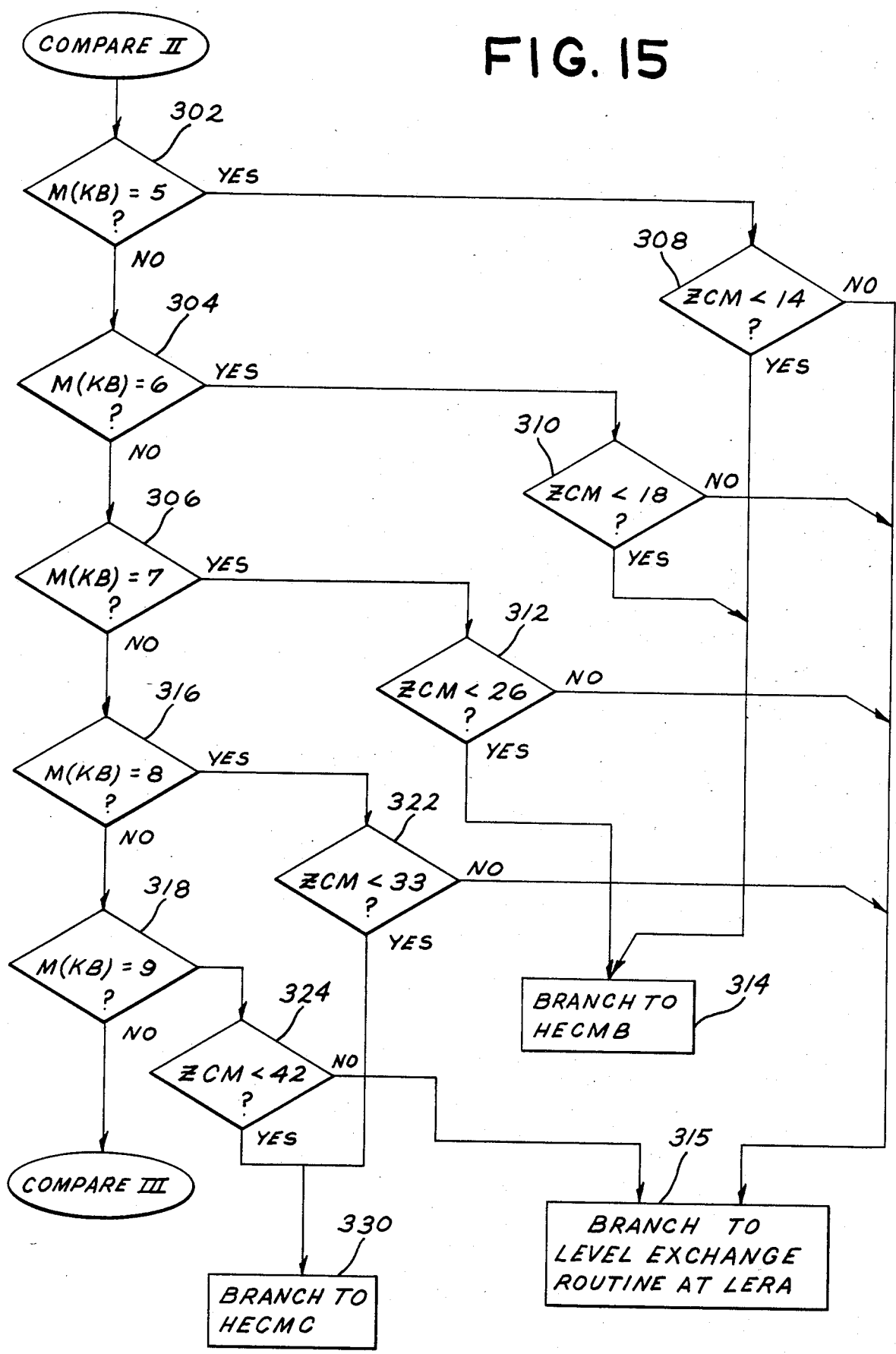
Figure 16:
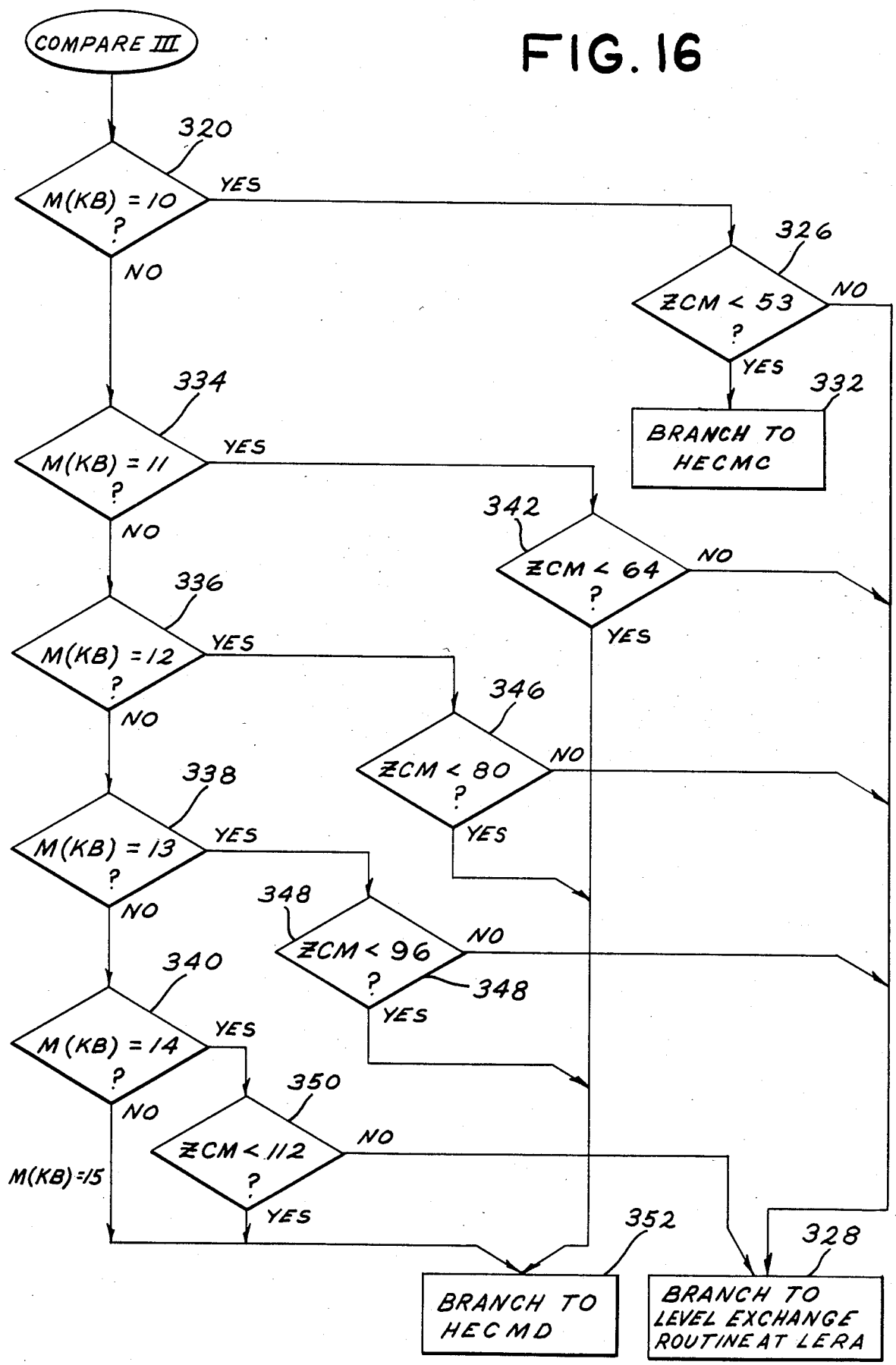

(f) POWER COMPARE ROUTINE—FIGS. 14–16

This routine performs the primary function of Compare Means 82 of FIG. 6, namely, to determine during each control interval whether or not the heating element is to be energized for the ensuing control interval. This is done by comparing the count of the Master Counter (ZCM) to a number corresponding to the number of control intervals for which the heating element is energized per control period for the power setting selected. For M(KB)=0 representing the OFF power setting, Inquiry 281 directs the program to the Counter Decrementing Routine HECDL (Block 282). For M(KB) representing power level settings of 1–4, (Inquiries 283–288), the ZCM count is compared to reference counts 3, 4, 7 and 10, respectively (Inquiries 290–296). If the power level selected is one of levels 1–4 and the ZCM count is less than the reference corresponding to that power level, the heating element will be energized during the ensuing control interval and the program branches (Block 298) to the Heater Energy Counter Routine, entry point HECMA (FIG. 17), to appropriately increment the Energy Counter. If the ZCM count is not less than the corresponding reference value of the selected power level, the program branches (Block 300) to the Level-Exchange FIG. 18. If the selected power level is not one of levels 1–4, the program continues (FIG. 15). Inquiries 302, 304, and 306 determine whether the selected power level is level 5, 6, or 7, respectively. The corresponding reference values for these power levels are 14, 18 and 26, respectively. If the selected power level is one of 5, 6, or 7 and the ZCM count is less than the corresponding reference value as determined by Inquiries 308–312, respectively, the heating element will be energized during the ensuing control interval, and the program branches (Block 314) to the Heater Energy Compare Routine, entry point HECMB (FIG. 17) to appropriately increment the Heater Energy Counter. If one of these power levels is selected but the count is greater than the corresponding reference value, the heating element will not be energized during the ensuing control interval and the program branches (Block 315) to the Level-Exchange, FIG. 18.

Figure 17:
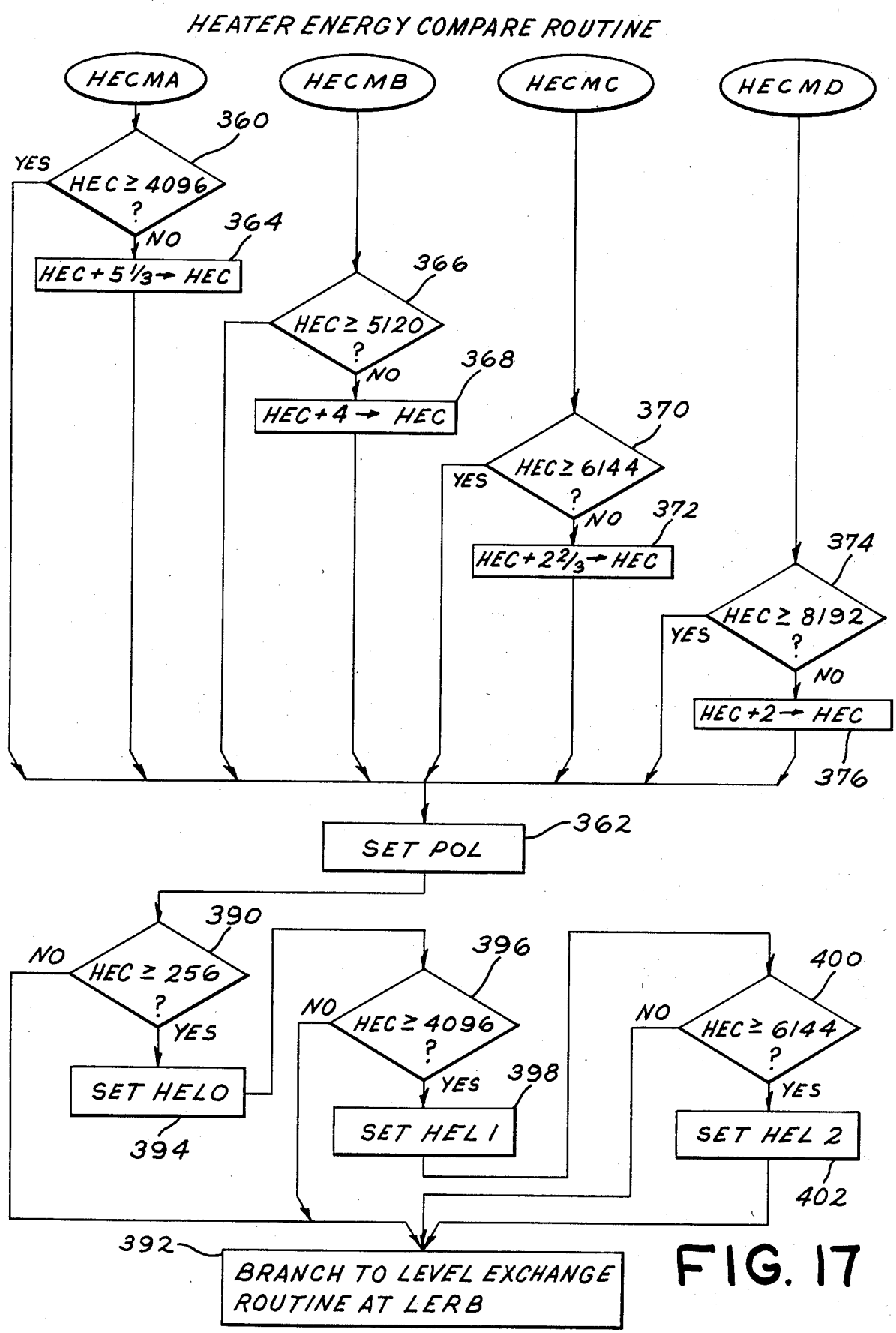
FIGS. 17–18 depict the flow diagram of the HEATER ENERGY COMPARE routine incorporated in the control program for the microprocessor in the circuit of FIG. 7.

Inquiries 316, 318, (FIG. 15) and 320 (FIG. 15) determine whether power levels 8, 9 and 10 have been selected, respectively. The reference values associated with these power levels are 33, 42 and 53, respectively. If the ZCM count is less than the reference value corresponding to the selected power level, as determined by Inquiries 322, 324 (FIG. 15) and 326 (FIG. 16) the heating element will be energized during the ensuing control interval, and the program branches (Block 330 (FIG. 15) for Inquiries 322 and 324; Block 332 for Inquiry 326 (FIG. 16) to the Heater Energy Compare Routine at entry point HECMC (FIG. 17) to increment the Heater Energy Counter at the appropriate rate. If one of these levels is selected but the ZCM count is greater than the reference value, the program branches (Block 315) for Inquiries 322 and 324 (FIG. 15) and Block 328 for Inquiry 326 (FIG. 16) to the Level-Exchange, FIG. 18. Finally, Inquiries 334, 336, 338 and 340 determine whether power level 11, 12, 13, or 14 has been selected, respectively; corresponding reference values are 64, 80, 96, and 112, respectively. If the ZCM count is less than the corresponding reference value as determined by Inquiries 342–350 for one of the selected power levels, the heating element will be energized during the ensuing control interval, and the program branches (Block 352) to the Heater Energy Compare Routine at entry point HECMD (FIG. 17) to increment the Heater Energy Counter. Additionally, if the answer to Inquiry 340 is no, the selection must represent power level 15, which is the maximum power level for which the heating element is energized for every control interval, and the program branches (Block 352) to Heater Energy Compare Routine at entry point HECMD (FIG. 17). If one of levels 11-14 is selected and the ZCM count is greater than or equal to the reference value, the program branches (Block 328) to the Level-Exchange Routine (FIG. 18).

Figure 18:
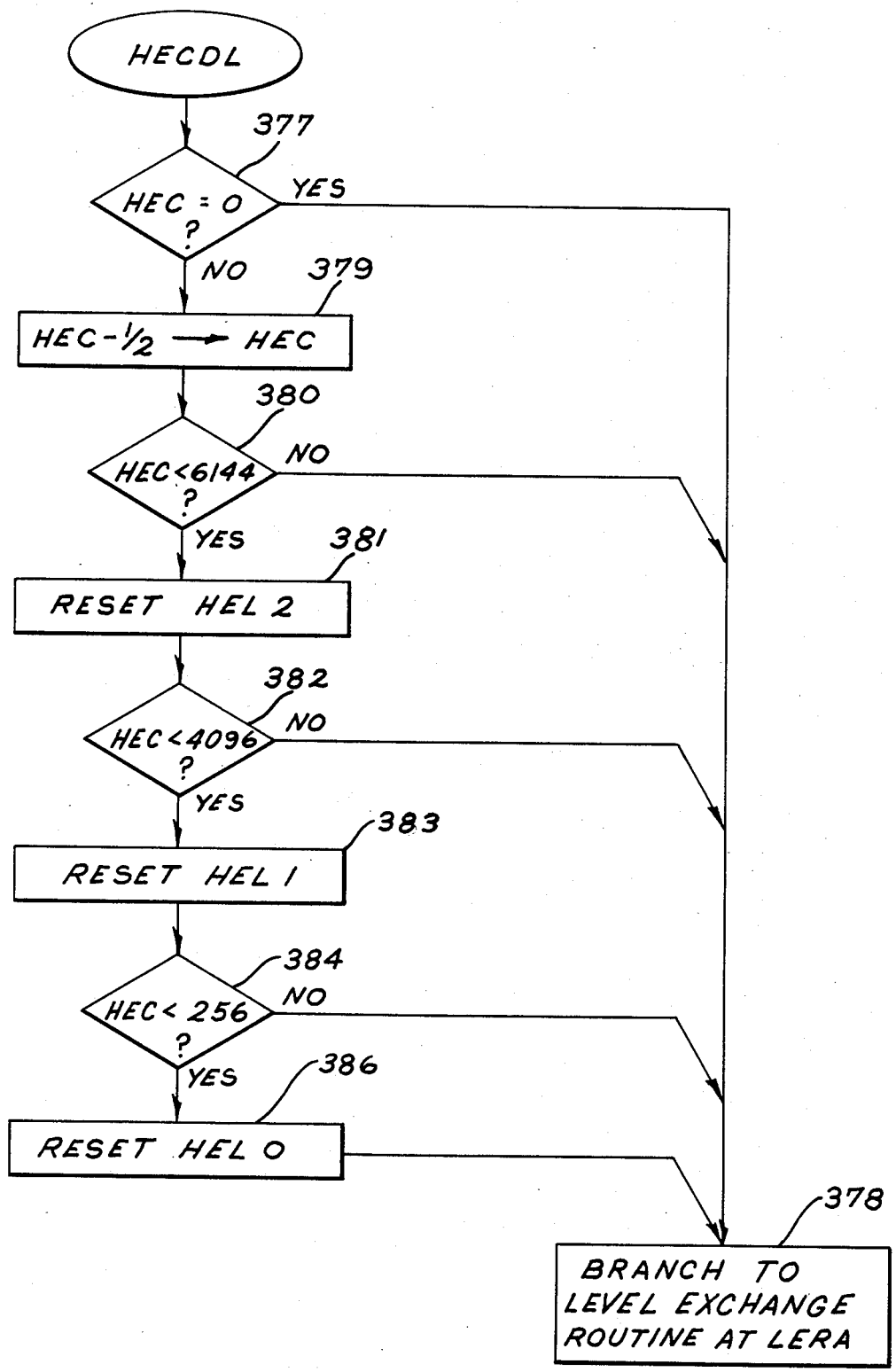

(g) HEATER ENERGY COMPARE ROUTINE—FIGS. 17 and 18

This routine performs the function of Counter Control Means 48 of FIGS. 2 and 6, by incrementing the Heater Energy Counter at the rate associated with the power level at which the heating element is operating; discontinuing the incrementing of the Heater Energy Counter when a maximum count for the power level is reached, and decrementing the Heater Energy Counter at a predetermined rate when the OFF power level is selected. When the heating element is to be energized during the next control interval as determined by the Power Compare Routine hereinbefore described, this routine is entered at one of points HECMA-HECMD, depending upon the power level at which the heating element is operating. When entered at one of these points, the Heater Energy Counter is incremented the appropriate number of counts and the Power Out Latch POL is set. When the POL is set a signal will be generated at R4 at the beginning of the next control interval for element 12 to hold contacts RL1(a) and RL1(b) closed for the duration of that control interval. This routine is only entered at one of points HECMA-HECMD, and thus the Heater Energy Counter is only incremented when the Power Compare Routine determines that the heating element is to be energized during the next control interval.

If one of power levels 1-4 has been selected, this routine is entered at entry point HECMA. Inquiry 360 determines whether the Heater Energy Counter has reached the maximum count for these four settings of 4096. If the count is less than the maximum count for these power settings, the Heater Energy Counter is incremented $5\frac{1}{3}$ counts (Block 364), and the Power On Latch is set (Block 362). This increments the HEC at rates of 16, $21\frac{1}{3}$, $37\frac{1}{3}$, and $53\frac{1}{3}$ counts per control period for settings 1-4, respectively. Setting of POL (Block 362) will close the heater control relay for the next control interval. If the maximum count has been reached, Block 364 is bypassed, leaving the HEC count unchanged, and POL is set (Block 362).

If the heating element is being operated at one of levels 5-7, this routine is entered at HECMB. Inquiry 366 determines if the maximum count of 5120 for these levels has been reached. If not, the Heater Energy Counter (HEC) is incremented by 4 counts (Block 368), and the POL is set (Block 362). This increments the HEC at the rate of 56, 72, and 104 counts per control period for settings 5, 6 and 7, respectively. If the maximum count has been reached, Block 368 is bypassed, leaving the count of the HEC unchanged, and the POL is set (Block 362).

If the heating element is operating at one of levels 8-10, this routine will be entered at point HECMC. Inquiry 370 determines if the maximum count of 6144 has been reached. If not, the HEC is incremented by $2\frac{2}{3}$ counts (Block 372), and the POL is set (Block 362). This increments the HEC at an effective rate of 88, 112, and $141\frac{1}{3}$ counts per control period for levels 8, 9 and 10, respectively. If the maximum count has been reached, Block 372 is bypassed, leaving the HEC count unchanged, and POL is set (Block 362).

If the heating element is being operated at one of power levels 11-15, this routine is entered at entry point HECMD. Inquiry 374 determines whether the maximum count for these power levels of 8192 has been reached. If not, the HEC is incremented by 2 (Block 376), and the POL is set (Block 362). This increments the HEC at an effective rate of 128, 160, 192, 224 and 256 counts per control period for levels 11, 12, 13, 14 and 15, respectively. If the maximum count has been reached, Block 376 is bypassed, leaving the count of the HEC unchanged, and POL is set (Block 362).

Figure 19:
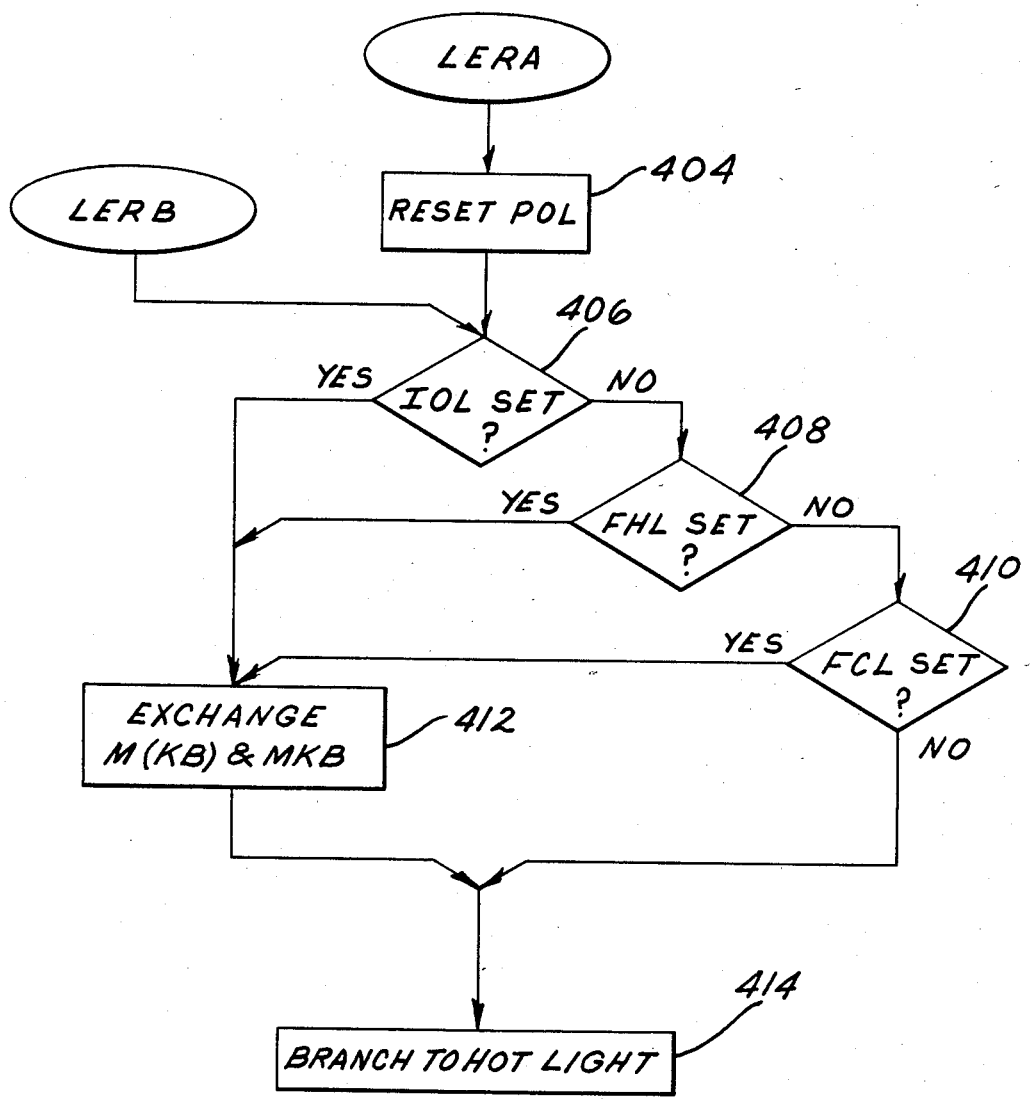
FIG. 19 is a flow diagram of the LEVEL EXCHANGE/HOT LIGHT routine incorporated in the control program for the microprocessor in the circuit of FIG. 7.

If the OFF power setting is being implemented, this routine is entered at entry point HECDL (FIG. 18) and Inquiry 377 determines whether the count of HEC is zero. If it is, the program branches (Block 378) to the Level-Exchange Routine at entry point LERA (FIG. 19). If not, the count is decremented by $\frac{1}{2}$ count (Block 379). This decrements the HEC at a rate of 64 counts per control period. Inquiry 380 determines whether the count has decreased below 6144, the threshold count for HEL2, the Heater Energy Latch which enables the Fast-Cool mode when set. If not, HEL1 is reset (Block 381) and the program branches (Block 378) to the Level-Exchange Routine at entry point LERA (FIG. 18). If the count is less than 6144, HEL2 is reset (Block 381) and Inquiry 382 determines whether the count has decreased below 4096, the threshold count for HEL1, the Heater Energy Latch which enables the Fast-Heat mode when reset. If not, the program branches (Block 378) to the Level-Exchange Routine at entry point LERA (FIG. 19). If the count is less than 4096, HEL1 is reset (Block 383) and Inquiry 384 determines whether the count has decreased below 256, the threshold count for HEL0, the Heater Energy Latch which when set enables energization of the Hotlight. If not, the program branches (Block 378) to the Level-Exchange Routine at entry point LERA (FIG. 19). If the count is less than 256, HEL0 is reset (Block 386) and the program branches (Block 378) to the Level-Exchange Routine at entry point LERA (FIG. 19).

Referring again to FIG. 17 for the non-OFF power settings, after having set the POL Latch (Block 362), the program then determines which, if any, of the transient mode control latches controlled by the Heater Energy Counter should be set, thereby carrying out the function of Counter Compare Means 86 of FIG. 6. Inquiry 390 determines whether the HEC count is greater than or equal to the Hot Light threshold count of 256. If not, the program branches (Block 392) to the Level Exchange Routine at Entry Point LERB, FIG. 19. If it is, the Hot Light Latch (HEL0) is set (Block 394). Inquiry 396 then determines if the HEC count is greater than or equal to the Fast-Heat Latch threshold count of 4096. If not, the program branches (Block 392) to LERB, FIG. 19. If so, HEL1 is set (Block 398). Inquiry 400 determines whether the HEC count is greater than or equal to the Fast-Heat threshold count of 6144. If not, the program branches (Block 392) to the Level-Exchange Routine at entry point LERB (FIG. 19). If so, HEL2 is set (Block 402) and the program branches (Block 392) to LERB, FIG. 19.

(h) LEVEL-EXCHANGE ROUTINE—FIG. 19

The function of the Level-Exchange routine is to reset the Power On Latch if the element is not to be energized during the next control interval as determined by the Power Compare Routine; if the heating element is being operated in one of the transient modes, Instant On, Fast-Heat or Fast-Cool, to re-exchange the values of M(KB) and MKB to restore the actual power level setting selected to the M(KB) memory location for the beginning of the next pass through the control routine.

If the heating element is not to be energized during the next control interval, this routine is entered at entry point LERA, and the Power On Latch (POL) is reset (Block 404). If the heating element is to be energized during the next control interval, the routine is entered at entry point LERB, bypassing Block 404. Inquiries 406, 408 and 410 determine whether the Instant On, Fast-Heat and Fast-Cool Latches, respectively, are set. If so, it is necessary to place the actual power setting selected by the user back in memory location M(KB). This is accomplished by Block 412. If none of these latches is set, the actual setting is already in M(KB) and Block 412 is bypassed. The program then branches (Block 44) to the Power Out Routine, FIG. 20.

Figure 20:
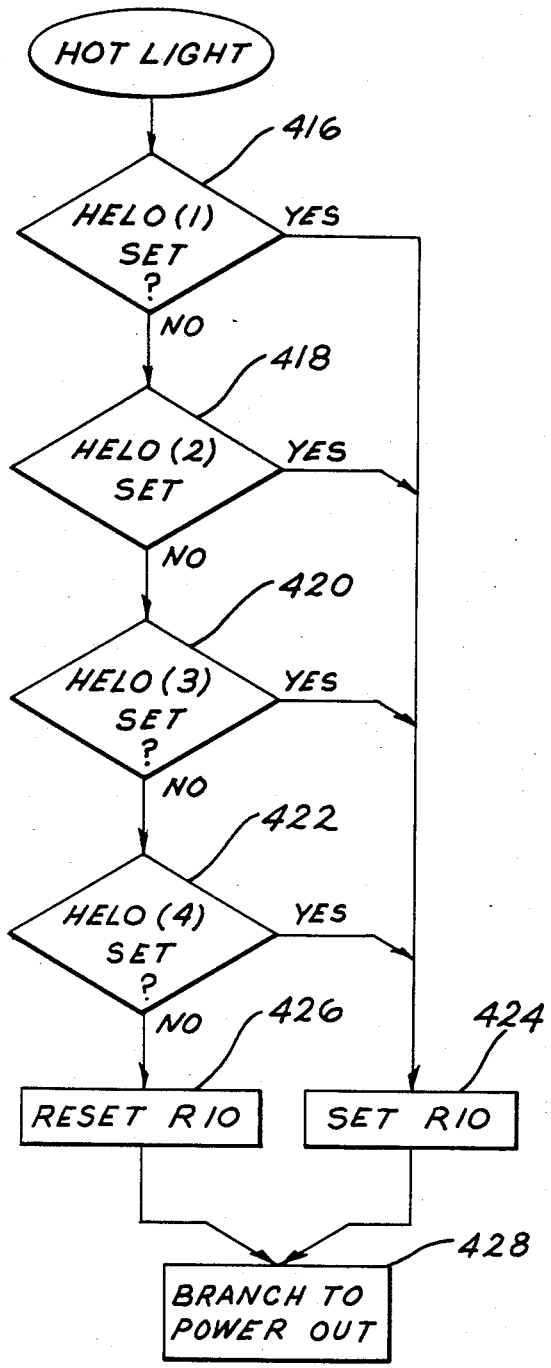
FIG. 20 is a flow diagram of the HOTLIGHT Routine incorporated in the control program for the microprocessor in the circuit of FIG. 7.

(i) HOTLIGHT ROUTINE—FIG. 20

The function of this routine is to generate the output signal at output port R10 for controlling energization of the Hotlight. Output port R10 is coupled to LED 32 via driver circuit 120. It will be recalled that the Hotlight is to be energized if one or more of the heating elements is hot, indicated by the Heater Energy Counter.

Inquiries 416, 418, 420 and 422 check the state of the Hotlight Latch, designated HEL0(n) for n=1-4. The n index associates each latch with one of heating elements 12-18 for n=1-4, respectively. If the answer is yes to any of these inquiries, R10 is set, thereby energizing the Hotlight. If the HEL0 latches for all four heating elements are reset, indicating that the count of the Heater Energy Counter for each of the elements indicates a temperature less than the Hotlight threshold temperature, R10 is reset (Block 426), thereby deenergizing the Hotlight. The program then branches (Block 428) to the Power Out Routine, FIG. 21.

Figure 21:
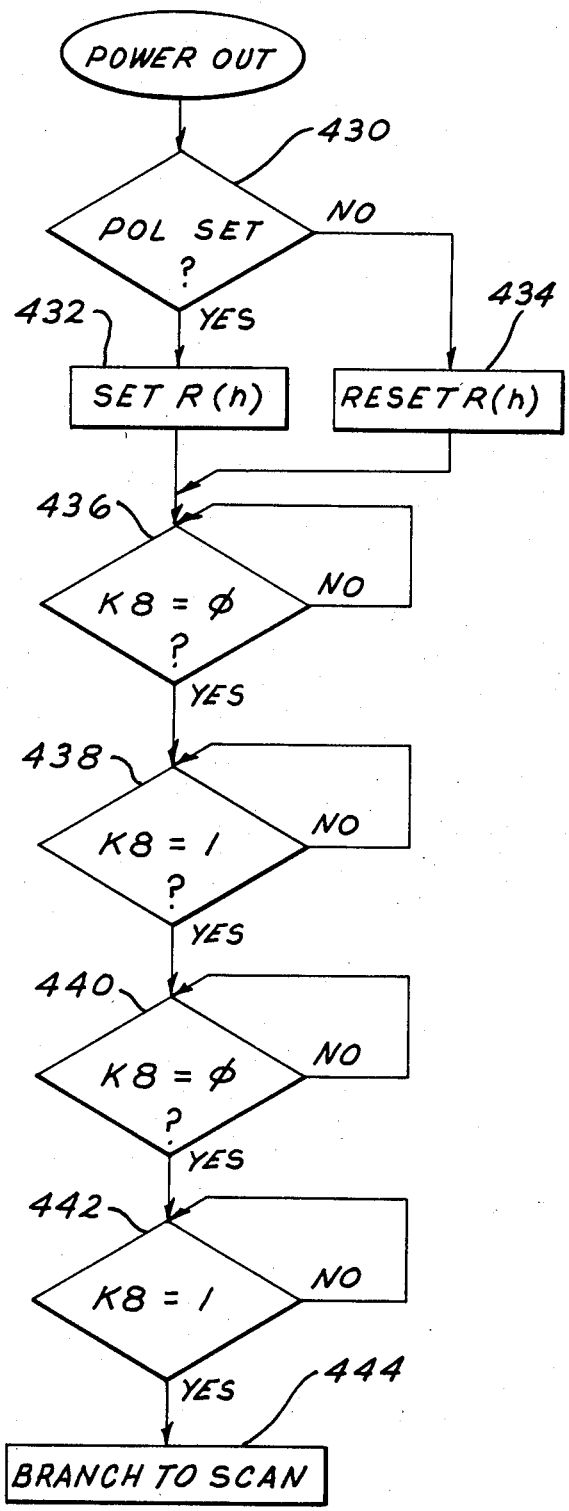
FIG. 21 is a flow diagram of the POWER OUT routine incorporated in the control program for the microprocessor in the circuit of FIG. 7.

(j) POWER OUT ROUTINE—FIG. 21

The function of this routine is to generate the output signals at output ports R4–R7 for controlling relays RL1–RL4, respectively. Inquiry 430 checks the state of the Power Out Latch (POL). If set, the output port R(n) is set (Block 432). The index n identifies the output port associated with the particular heating element routine being executed. For heating elements 12-18 the associated output ports are R4–R7, respectively. Thus, for the routine for heating elements 12-18, index n equals 4-7, respectively. When R4 is set, relay contacts RL1(a) and RL1(b) are closed, enabling energization of heating element 12. If the POL is not set for heating element 12, output port R4 is reset (Block 434), thereby opening contacts RL1(a) and RL1(b) and deenergizing heating element 12.

Inquiries 436, 438, 440 and 442 check the state of port K8 to introduce a delay of two cycles of the power signal. Input port K8 receives zero crossing signals from circuit 103 (FIG. 7). Positive half-cycles are represented by K8=1 and negative half-cycles by K8=0. Following ing this delay the program branches (Block 444) to the Scan Routine for the next heating element. Thus, the control routine for each heating element is executed once every eight cycles of the power signal to provide the desired eight-cycle control interval for each heating element.

E. System with Enhanced Decrement Capability

In accordance with the form of invention hereinbefore described, the heater energy counter means is only decremented when the OFF power setting is selected. This has the advantage of economy of memory storage capacity and, for the most part, performs satisfactorily. However, this approach may introduce a degree of temperature monitoring error into the system when the power setting is changed directly from one power setting to a lower power setting having a lower maximum count without an intermediate OFF setting of sufficient duration to decrement the heater energy counter below the maximum count for the lower power setting. In accordance with the form of the invention to be hereinafter described, improved temperature monitoring accuracy when changing from higher to lower power settings is achieved by modifying counter control means 48 in the control arrangement of FIGS. 2 and 6 to decrement the heater energy counter when the power setting is changed from a higher setting to a lower setting at one of a plurality of predetermined decrement rates, each of which is approximately proportional to the rate of decrease of the heating element temperature during the cool-down phase as the heating element temperature decreases from the relatively high steady state operating temperature associated with the higher power setting to the relatively low, steady state operating temperature associated with the newly selected lower power setting. The modified counter control means discontinues decrementing the heating energy counter when the count is less than the predetermined maximum count corresponding to the selected lower power setting.

TABLE II

| COL. 1 SELECTED POWER LEVEL | COL. 2 % ON TIME | COL. 3 ON CONTROL INTERVALS PER CONTROL PERIOD | COL. 4 OFF CONTROL INTERVALS | COL. 5 HEATER ENERGY COUNTER DECREMENT RATE (COUNTS PER ENERGIZED CONTROL INTERVAL) | COL. 6 HEATER ENERGY COUNTER DECREMENT RATE (COUNTS PER CONTROL PERIOD) | COL. 7 MAX. HEC COUNT |
|---|---|---|---|---|---|---|
| 1 | 2 | 3 | 125 | $-2\frac{2}{3}$ | $-8$ | 4096 |
| 2 | 3 | 4 | 124 | $-2\frac{2}{3}$ | $-10\frac{2}{3}$ | 4096 |
| 3 | 5 | 7 | 121 | $-2\frac{2}{3}$ | $-18\frac{2}{3}$ | 4096 |
| 4 | 8 | 10 | 118 | $-2\frac{2}{3}$ | $-26\frac{2}{3}$ | 4096 |
| 5 | 11 | 14 | 114 | $-2$ | $-28$ | 5120 |
| 6 | 14 | 18 | 110 | $-2$ | $-36$ | 5120 |
| 7 | 20 | 26 | 102 | $-2$ | $-52$ | 5120 |
| 8 | 26 | 33 | 95 | $-1$ | $-33$ | 6144 |

TABLE II-continued

| COL. 1 SELECTED POWER LEVEL | COL. 2 % ON TIME | COL. 3 ON CONTROL INTERVALS PER CONTROL PERIOD | COL. 4 OFF CONTROL INTERVALS | COL. 5 HEATER ENERGY COUNTER DECREMENT RATE (COUNTS PER ENERGIZED CONTROL INTERVAL) | COL. 6 HEATER ENERGY COUNTER DECREMENT RATE (COUNTS PER CONTROL PERIOD) | COL. 7 MAX. HEC COUNT |
|---|---|---|---|---|---|---|
| 9  | 33  | 42  | 86 | −1 | −42 | 6144 |
| 10 | 41  | 53  | 75 | −1 | −53 | 6144 |
| 11 | 50  | 64  | 64 | —  | —   | 8192 |
| 12 | 60  | 80  | 48 | —  | —   | 8192 |
| 13 | 72  | 96  | 32 | —  | —   | 8192 |
| 14 | 85  | 112 | 16 | —  | —   | 8192 |
| 15 | 100 | 128 | 0  | —  | —   | 8192 |

E.1 Parameter Selection Considerations

The decrement rates selected for power settings 1–15 to implement this decrement scheme are shown in Table II. The decrement rate listed for each setting is the rate at which the heater energy counter would be decremented when a particular power setting is selected as a result of switching to that setting from a power setting in one of the higher power setting groups. As in the case of increment rate selection hereinbefore described, the decrement rate values in Table II were selected by a process of empirical testing directed to finding values which provide satisfactory performance for the particular type of heating element to be used in the appliance. It is to be understood that the particular decrement rates selected depend upon the characteristics of the heating element itself, as well as the duty cycle at which it is operating. Thus, rates should be empirically determined for the particular system in which the counter arrangement is to be used.

It will be recalled that the power levels are grouped according to common maximum heating energy counter counts with settings 1–4 having a maximum count of 4096, settings 5–7 having a maximum count of 5120, settings 8–10 having a maximum count of 6144, and settings 11–15 at a maximum count of 8192. Obviously, for power setting changes from higher to lower within any one group, no decrementing of the counter is necessary since the steady state count for all settings within a particular group is the same. Thus, power settings 11–15 have no decrement rate listed in Table II since each of these settings lies in the highest group. It is to be understood, however, that a more accurate approximation of the temperature could be provided by providing a different maximum count for each setting and decrementing down at a rate associated with the lower setting at the expense of additional memory capacity. However, satisfactory performance has been obtained by the present power setting groupings.

As with the increment rates hereinbefore described with reference to Table I, the decrement counts per control interval are the same for settings within each group; however, the rate per control period varies within each group due to the differing number of ON control intervals per control period for each setting. For each of the power settings, the decrement rate per control period is selected as a linear approximation of the temperature curve characteristic of the cool-down phase for the heating element. In this context, the cool-down phase means the period of heating element temperature transition from the relatively higher state operating temperature associated with the previously selected relatively higher power setting to the lower steady state operating temperature associated with the selected lower power setting resulting from the change in power setting from a higher power setting to a lower power setting. Generally, for satisfactory approximation, the decrement rate is higher for the higher power settings. The reason for this is perhaps most easily understood by reference to the cool-down phase portions of the temperature versus time curves of FIG. 4. While the curves shown in FIG. 4 illustrate heating element cool-down following deenergization, the shape of the cool-down region of the curves are similar when changing from a higher to a lower power setting. It is apparent from FIG. 4 that during the cool-down phase the temperature decreases substantially more rapidly at the higher temperature than at the lower temperature. When the power setting is changed from a power setting in the 11–15 group to a power setting in the 8–10 group, the entire cool-down phase occurs in the relatively high temperature region of the temperature curve characterized by a relatively steep slope. Thus, the actual cool-down rate in this region is approximated by a relatively high decrement rate. On the other hand, when one of power settings 1–4 is selected, a significant portion of the cool-down phase occurs in the relatively low temperature region of the curve where the slope is less steep. This is true no matter what preceding higher power setting had been selected. Thus, the actual cool-down rate in this region is approximated by a relatively low decrement rate.

E.2 Functional Operation of the System

Functional operation of this form of the invention is identical to that described hereinbefore with reference to FIG. 6 with the exception of Counter Control Means 48 which is modified to decrement the heater energy counter when the power setting is changed from a higher setting to a lower setting. It will be recalled that Counter Control Means 48 responds to the digital power signal employed by Comparing Means 82 by incrementing Heater Energy Counter 46 at a rate determined by that power signal and that Counter Control Means 48 is operative to discontinue incrementing Heater Energy Counter 46 upon reaching a predetermined maximum count determined by the power setting at which the element is being energized and operated. However, if, after the heating element has been operating at a power setting in one of the relatively high power setting groups long enough for the heater energy counter to reach the predetermined maximum count associated with that group of settings, the power setting is changed to a power setting in one of the relatively lower power setting groups, the count of the energy counter will be greater than the predetermined maximum count associated with the newly selected lower power setting. The modified Counter Control Means 48 is thus further operative to detect when the count of Heater Energy Counter 46 exceeds the predetermined maximum count associated with the selected power setting and to decrement the Heater Energy Counter down to that count at a rate determined by the selected power setting.

E.3 Microprocessor Embodiment With Modified Control Program

This form of the invention is implemented using the control circuit of FIG. 9, with that portion of the ROM of microprocessor 106, which performs the function of the Counter Control Means 48, being modified to provide the enhanced decrement capability. Specifically, the ROM is modified by substituting the subroutine illustrated in the flow diagram of FIGS. 22 and 23 for that portion of the Heater Energy Compare Routine illustrated in FIG. 17. Since other subroutines hereinbefore described with reference to FIGS. 8–21 remain the same, circuit and microprocessor operation will be identical to that hereinbefore described, except for the enhanced decrement capability provided by the Alternate Heater Energy Compare subroutine (FIGS. 22 and 23).

Figure 22:
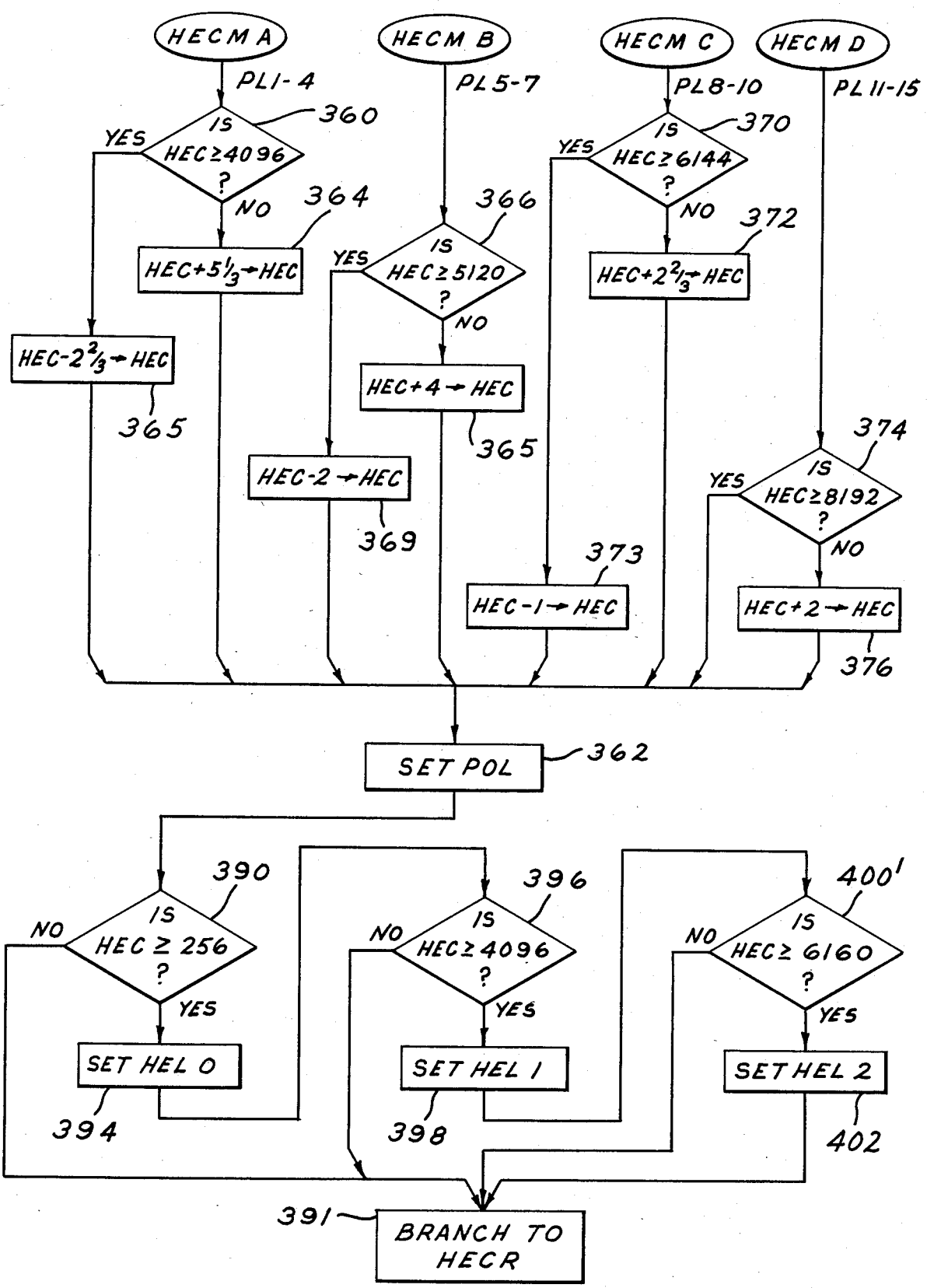
FIGS. 22 and 23 depict the flow diagram of an ALTERNATIVE HEATER ENERGY COMPARE routine which can be substituted for the routine of FIG. 17 in the control program for the microprocessor in the circuit of FIG. 7.
Figure 23:
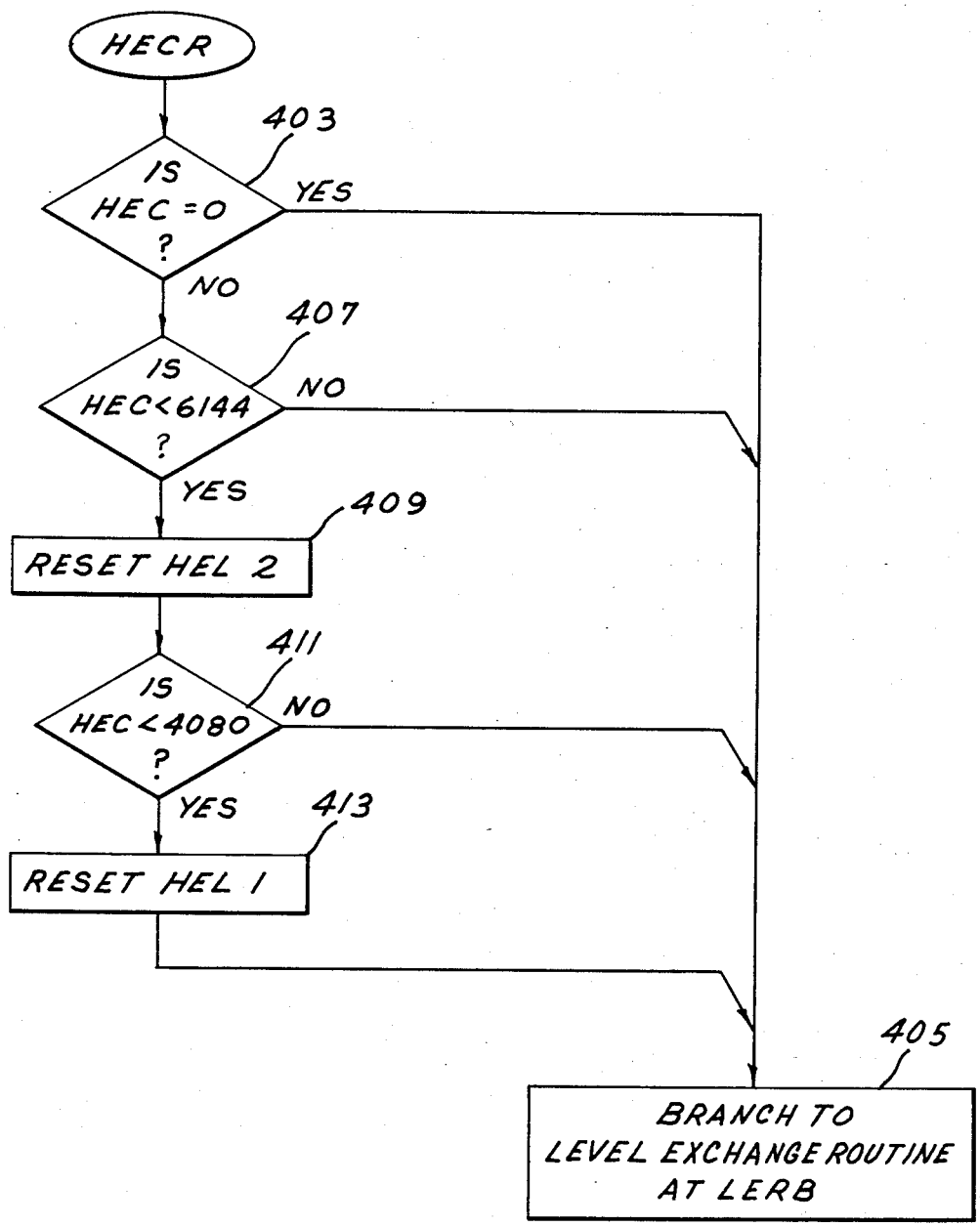

(a) ALTERNATE HEATER ENERGY COMPARE ROUTINE FIGS. 22 AND 23

The Alternate Heater Energy Compare Routine will now be described with reference to FIGS. 22 and 23. Identical reference numerals are used in FIGS. 17 and 22 to denote corresponding flow diagram function blocks.

It will be recalled that the Heater Energy Compare Routine hereinbefore described with reference to FIGS. 17–18 performs the function of Counter Control Means 48 of FIGS. 2 and 6 by incrementing the Heater Energy Counter at the rate associated with the power level at which the heating element is operating when the count is less than the maximum count for that selected level, discontinuing the incrementing of the Heater Energy Counter when the maximum count for the selected level is reached and decrementing the Heater Energy Counter at a predetermined rate when the OFF setting is selected. In the modified control program, the flow diagram of FIGS. 22 and 23 is substituted for that of FIG. 17 in the ROM of microprocessor 102 to additionally decrement the Heater Energy Counter when a change in power setting from a relatively high setting to a relatively low setting occurs, if the count of the Heater Energy Counter is greater than the maximum count associated with the selected power level, and at a rate which approximates the rate of temperature decrease when the heating element cools down to the steady state temperature associated with the selected lower power setting from the operating temperature associated with the previously selected relatively higher power setting. Since the portion of the routine illustrated in FIG. 18 which is entered to decrement the Heater Energy Counter when the OFF setting is selected is retained, the Heater Energy Counter is decremented just as previously described when the OFF setting is selected.

It will be further recalled that for non-OFF power settings the Heater Energy Counter is only incremented during control intervals immediately preceding those control intervals during which the heating element is to be energized. This same technique is employed for decrementing the Heater Energy Counter for non-OFF power settings. When the heating element is to be energized during the next control interval as determined by the Power Control Routine hereinbefore described (FIGS. 14–16), the Heater Energy Compare Routine of FIG. 22 is entered at one of points HECMA-HECMD, depending upon the selected power level. When entered at one of these points, the Heater Energy Counter is either incremented or decremented the appropriate number of counts and the Power Out Latch (POL) is set. When the POL is set, a signal will be generated at R4 at the beginning of the next control interval for element 12 to hold contacts RL1(*a*) and RL1(*b*) closed for the duration of that control interval.

If one of power levels 1–4 has been selected, this routine is entered at entry point HECMA. Inquiry 360 determines whether the Heater Energy Counter has reached the maximum count for these four settings of 4096. If the count is less than this maximum count this indicates that the heating element is still heating up, and the Heater Energy Counter is incremented $5\frac{1}{3}$ counts (Block 364) and the Power On Latch (POL) is set (Block 362). This increments the HEC at rates of 16, $21\frac{1}{3}$, $37\frac{1}{3}$, and $53\frac{1}{3}$ counts per control period for power settings 1–4, respectively. Setting of POL (Block 362) will close the heater control relay for the next control interval.

If the maximum count for settings 1–4 has been exceeded, this signifies that the heating element had been previously operating at a power setting higher than power setting 4, with a corresponding higher temperature, and that the Heater Energy Counter has not yet been decremented to the lower maximum count associated with power settings 1–4, which in turn signifies that the heating element is in the cool-down phase between its previous higher temperature and the lower temperature associated with the lower power setting. The Heater Energy Counter is thus decremented by $2\frac{2}{3}$ counts (Block 365), and the Power Out Latch is set (Block 362). This decrements the HEC at rates of 8, $10\frac{2}{3}$, $18\frac{2}{3}$, and $26\frac{2}{3}$ counts per control period for power settings 1–4, respectively.

If the heating element is presently being operated at one of levels 5–7, this routine is entered at HECMB. Inquiry 366 determines if the maximum count associated with these levels of 5120 has been reached. If not, HEC is incremented by 4 counts (Block 368) and POL is set (Block 362). This increaents the HEC at the rate of 56, 72 and 104 counts per control period for settings 5, 6 and 7, respectively. If the HEC count exceeds the maximum count, again indicating heating element operation in the cool-down phase following a change from a higher power setting, the HEC is decremented by 2 counts (Block 369) and the POL is set (Block 362). This decrements the HEC at an effective average rate of 28, 36, and 52 counts per control period for settings 5, 6 and 7, respectively.

If the heating element is operating at one of levels 8–10, this routine is entered at point HECMC. Inquiry 370 determines if the maximum count associated with these levels of 6144 has been reached. If not, the HEC is incremented by $2\frac{2}{3}$ counts (Block 372) and the POL is set (Block 362). This increments the HEC at an effective average rate of 88, 112, and $141\frac{1}{3}$ counts per control period for levels 8, 9 and 10, respectively. If the HEC count exceeds the maximum count, signifying operation in the cool-down phase following a change from a higher power setting, the HEC is decremented by 1 count (Block 373) and the POL is set (Block 362). This decrements the HEC at an effective rate of 33, 42 and 53 counts per control period for power settings 8, 9 and 10, respectively.

If the heating element is being operated at one of power levels 11–15, this routine is entered at entry point HECMD. Inquiry 374 determines whether the maximum count for these power levels of 8192 has been reached. If not, the HEC is incremented by 2 (Block 376) and the POL is set (Block 362). This increments the HEC at an effective rate of 128, 160, 192, 224 and 256 counts per control period for levels 11, 12, 13, 14 and 15, respectively. Since there are no conditions under which selection of one of these power levels requires decrementing of the HEC, if the maximum count has been reached Block 376 is bypassed, leaving the count of the HEC unchanged and POL is set (Block 362).

After having set the POL (Block 362), the program then determines which, if any, of the transient mode control latches controlled by the HEC should be set thereby carrying out the function of Counter Compare Means 86 of FIG. 4. Inquiry 390 determines whether the HEC count is greater than or equal to the Hot Light threshold count of 256. If not, the program branches (Block 391) to HECR (FIG. 23). If it is, the Hot Light Latch (HEL0) is set (Block 394). Inquiry 396 then determines if the HEC is greater than or equal to the Fast Heat Latch threshold count of 4096. If No, the program branches (Block 391) to HECR (FIG. 23). If Yes, the Fast Heat Latch (HEL1) is set (Block 398). Inquiry 400' determines whether the HEC count is greater than or equal to the Fast Cool threshold count of 6160. If No, the program branches (Block 391) to HECR (FIG. 23). If Yes, HEL2 is set (Block 402) and the program branches (Block 391) to HECR (FIG. 23).

The function of that portion of this subroutine entered (HEL1 or HEL2) at HECR (FIG. 23) is to determine whether either of the Heater Energy Latches or the Hotlight Latch (HEL0) need to be reset as a result of having decremented the Heater Energy Counter below a corresponding reset threshold count. Thus, having branched from Block 391 (FIG. 22) to entry point HECR (FIG. 23), Inquiry 403 determines whether the HEC count is zero. If Yes, the Latches will have been reset on previous passes and no further inquiries are needed, and the program branches (Block 405) to the Level Exchange Routine at entry point LERB. If HEC is not zero, Inquiry 407 determines whether the HEC count is less than the reset threshold count for HEL2 of 6144. If No, then the count necessarily exceeds the lower threshold reset count, no further inquiries are required, and the program branches (Block 405) to Level Exchange Routine at entry point LERB. If the HEC count is less than the reset threshold value, HEL2 is reset (Block 409). It will be observed that the threshold reset value for HEL2 is 16 counts less than the threshold set value for HEL2 (Inquiry 400) (FIG. 22). Because of the manner of incrementing and decrementing the HEC, the count may toggle about the maximum count for the selected power levels. For example, if power level 10 is selected after operating at one of power levels 11–15, such that the HEC initially exceeds the maximum of 6144 for power level 10, the HEC is decremented down to 6143. The next pass, Inquiry 370 will detect a count less than 6144 and HEC will be incremented to 6146 and will thereafter toggle between 6143 and 6146; however, the maximum count for power levels 8–10 will never exceed 6146. Thus, by selecting the threshold reset value 16 counts lower than the threshold set count, HEL2 will not be set once having been reset at Block 409, until one of power levels 11–15 is again selected.

Inquiry 411 determines whether the HEC count is less than the reset threshold of 4080 for HEL1. If No, the program branches to the Level Exchange Routine at LERB (Block 405). If Yes, HEL1 is reset (Block 413) and then the program branches to Level Exchange Routine at LERB (Block 405). As with HEL2, the reset threshold for HEL1 is set at 16 counts below the maximum count of 4096 for power settings 1–4. This value is sufficiently below the maximum count to assure that HEL1 is only reset when the HEC count drops below the minimum steady state count for power levels 1–4, which in this embodiment is 4093. The HEC count will only drop below this level when the OFF setting is selected.

Upon branching to entry point LERB of the Level Exchange Routine (FIG. 19), the program proceeds in the same manner hereinbefore described with reference to FIGS. 19–21.

When the OFF power setting is selected, the Heater Energy Compare Routine is entered at HEDCL (FIG. 18) and the program proceeds in the same manner as hereinbefore described with reference to FIGS. 18–21.

Thus, by substituting the control routine of FIGS. 22 and 23 for that of FIG. 17, a control arrangement is provided which enables the HEC to more accurately track the actual heating element temperature under operating conditions in which the power setting is changed from a relatively higher power setting to a relatively lower power setting.

While in accordance with the Patent Statutes, specific embodiments of the present invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An arrangement for monitoring the approximate temperature of a resistive heating element adapted for selective energization by a power signal from an external power supply at one of a plurality of power levels ranging from relatively low power levels, including an OFF level, to relatively high power levels, the heating element having a temperature response characterized by a transient heat-up phase followed by a steady state phase when the power level is changed from OFF to some other power level; and by a transient cool-down phase when the power level is changed from a relatively higher power level to a relatively lower power level, the temperature monitoring arrangement comprising:

energy counter means for approximately tracking the heating element temperature and counter control means operative to selectively increment said energy counter means at an increment rate which is approximately proportional to the rate of increase of the heating element temperature during the heat-up phase for the applied power level, and to discontinue incrementing said energy counter means when said count at least equals a predetermined maximum count which is approximately proportional to the steady state heating element temperature for the selected power level; said counter control means being further operative to decrement said energy counter means when the power level selection is changed from a relatively higher power level to a relatively lower power level at a decrement rate which is approximately proportional to the rate of decrease of the heating element temperature during its cool-down phase, and to discontinue decrementing ssdid energy counter means when said count is less than a predetermined maximum count which is approximately proportional to the steady state operating temperature of the heating element at the selected relatively lower power level;

whereby the count of said energy counter means is approximately proportional to the temperature of the heating element. during the heat-up, steady state and cool-down phases of heating element operation.

2. An arrangment for monitoring the approximate temperature of a resistive heating element adapted for selective energization by a power signal from an external power supply at one of a plurality of power levels in response to selection by an operator of one of a plurality of power settings including an OFF setting, the heating element having a temperature response characterized by a transient heat-up phase followed by a steady state phase when the power setting is changed from OFF to some power setting; and by a transient cool-down phase when the power setting is changed from a non-OFF setting to the OFF setting, the arrangement comprising:

energy counter means;

counter control means for selectively incrementing said energy counter means at one of a plurality of increment rates, each of which is approximately proportional to the rate of increase of the heating element temperature during the heat-up phase when operated at a corresponding power level, said one increment rate being selected according to the power level at which the element is being operated; said counter control means being further operative to discontinue incrementing said energy counter means when said count at least equals a selected one of a plurality of predetermined maximum counts each of which is approximately proportional to the steady state heating element temperature for corresponding power settings, said selected one maximum count being selected according to the selected power setting; said counter control means being further operative to decrement said energy counter means at a predetermined decrement rate in response to selection of the OFF power setting, said predetermined decrement rate being approximately proportional to the rate of decrease of the heating element temperature during its cool-down phase;

whereby the count of said energy counter means is approximately proportional to the temperature of the heating element during the heat-up, steady state and cool-down phases of heating element operation.

3. An arrangement for monitoring the approximate temperature of a resistive heating element adapted for selective energization by a power signal from an external power supply at one of a plurality of different power levels in response to selection by an operator of one of a plurality of power settings ranging from relatively low power settings, including an OFF setting, to relatively high power settings, the heating element having a temperature response characterized by a transient heat-up phase followed by a steady state phase when the power setting is changed from one relatively low power setting including OFF to some relatively higher power setting; and by a transient cool-down phase when the power setting is changed from a relatively higher power setting to a relatively lower power setting, the arrangement comprising:

energy counter means for approximately tracking the heating element temperature;

counter control means operative to: selectively increment said energy counter means at one of a plurality of increment rates, each of which is approximately proportional to the rate of increase of the heating element temperature during the heat-up phase when operated at a corresponding power level, said one increment rate being selected according to the power level at which the element is being operated; discontinue incrementing said energy counter means when said count at least equals a selected one of a plurality of predetermined maximum counts each of which is approximately proportional to the steady state heating element temperature for corresponding power settings, said selected one maximum count being selected according to the selected power setting; decrement said energy counter means when the selected power setting is changed from a relatively higher power setting to a relatively lower power setting at one of a plurality of predetermined decrement rates, each of which is approximately proportional to the rate of decrease of the heating element temperature during the cool-down phase as the heating element temperature decreases from a relatively high operating temperature associated with the previously selected higher power setting to the relatively lower steady state operating temperature associated with the selected lower power setting; and discontinue decrementing said energy counter means when said count is less than that one of said predetermined maximum counts corresponding to the lower power setting;

whereby the count of said energy counter means is approximately proportional to the temperature of the heating element during the heat-up, steady state and cool-down phases of heating element operation.

4. An arrangement for monitoring the approximate temperature of a resistive heating element adapted for selective energization at a plurality of discrete power levels by a power signal from an external power supply in response to the selection by the user of one of a plurality of available discrete power settings including an OFF power setting, the heating element having a temperature response characterized when the power setting is changed from OFF to another setting by a transient heat-up phase followed by a steady state phase and by a transient cool-down phase when the power setting is changed to OFF from another setting, said control arrangement comprising:

power control means for operating the heating element at the power level corresponding to the selected power setting over repetitive control periods, each of predetermined duration, by selectively enabling energization of the heating element for a predetermined portion of each control period as a function of the selected power setting;

energy counter means for approximately tracking the temperature of the heating element;

counter control means for selectively incrementing said energy counter means during each control period at a rate determined as a function of the power level at which element is being operated, said rate being such that the incremental increase in the count of said counter during each control period is approximately proportional to the increase in the temperature of the heating element during that control period;

whereby the count of said energy counter means is approximately proportional to the temperature of the heating element during the heat-up phase;

said counter control means being further operative to selectively discontinue the count at one of a plurality of predetermined maximum counts, each of said plurality of maximum counts being approximately proportional to the steady state temperature for a corresponding power level setting, said one maximum count corresponding to the selected power level, whereby the count of said energy counter is approximately proportional to the temperature of the heating element during the steady state phase; and means for detecting a change in the selected power level from a relatively higher power setting to a relatively lower power setting including the OFF setting;

said counter control means being responsive to said detecting means and operative to decrement said energy counter means at one of a plurality of predetermined decrement rates when said change is detected, each of said decrement rates approximately proportional to the rate of decrease of the heating element temperature during its cool-down phase following the change from the higher power setting to the lower power setting, and wherein said counter control means is further operative to discontinue decrementing said counter means at that one of said maximum counts corresponding to the lower power setting whereby the count of said energy counter is approximately proportional to the temperature of the heating element during the cool-down phase.

5. An arrangement in accordance with claim 4 further comprising indicator means responsive to said energy counter means operative to generate a signal detectable by the operator when a predetermined relationship exists between the count of said energy counter and a predetermined reference value, signifying the existence of a particular operating condition of the heating element, thereby indicating to the operator the existence of the particular operating condition.

6. An arrangement in accordance with claim 5 wherein said predetermined reference value is representative of a relatively hot temperature and wherein said predetermined relationship exists when said count of said energy counter means is greater than said reference value, thereby indicating to the operator that the heating element is relatively hot.

7. An arrangement in accordance with claim 6 wherein said indictor means comprises an indicator light which generates a visual signal when energized, and means for energizing said light when the count of said energy counter means is greater than said predetermined count and inhibiting energization of said light when the count of said energy counter means is less than said predetermined count;

whereby a visual signal is provided to the operator signaling that the heating element is relatively hot.

8. An arrangement for monitoring the approximate temperature of a resistive heating element adapted for selective energization at a plurality of discrete power levels by a power signal from an external power supply in response to the selection by the user of one of a plurality of available discrete power settings including an OFF power setting, the heating element having a temperature response characterized when the power setting is changed from OFF to another setting by a transient heat-up phase followed by a steady state phase and by a transient cool-down phase when the power setting is changed to OFF from another setting, said control arrangement comprising:

power control means for operating the heating element at the power level corresponding to the selected power setting over repetitive control periods, each of predetermined duration, by selectively enabling energization of the heating element for a predetermined portion of each control period as a function of the selected power setting;

energy counter means for approximately tracking the temperature of the heating element;

counter control means for selectively incrementing said energy counter means during each control period at a rate determined as a function of the power level at which the element is being operated, said rate being such that the incremental increase in the count of said counter during each control period is approximately proportional to the increase in the temperature of the heating element during that control period, whereby the count of said energy counter means is approximately proportional to the temperature of the heating element during the heat-up phase;

said counter control means being operative to selectively discontinue the count at one of a plurality of predetermined maximum counts, each of said plurality of maximum counts being approximately proportional to the steady state temperature for a corresponding power level setting, said one maximum count corresponding to the selected power level, whereby the count of said energy counter is approximately proportional to the temperature of the heating element during the steady state phase; and means for detecting a change in the selected power level from a non-OFF power setting to an OFF setting;

said counter control means being responsive to said detecting means and operative to decrement said energy counter means at a predetermined decrement rate when said change is detected, said decrement rate approximating the rate at which the temperature of the heating element decreases during the cool-down phase of operation, whereby the count of said energy counter is approximately proportional to the temperature of the heating element during the cool-down phase.

9. An arrangement in accordance with claim 8 further comprising indicator means responsive to said energy counter means operative to generate a signal detectable by the operator when a predetermined relationship exists between the count of said energy counter and a predetermined reference value, signifying the existence of a particular operating condition of the heating element, thereby indicating to the operator the existence of the particular operating condition.

10. An arrangement in accordance with claim 9 wherein said predetermined reference value is representative of a relatively hot temperature and wherein said predetermined relationship exists when said count of said energy counter means is greater than said reference value, thereby indicating to the operator that the heating element is relatively hot.

11. An arrangement in accordance with claim 10 wherein said indicator means comprises an indicator light which generates a visual signal when energized, and means for energizing said light when the count of said energy counter means is greater than said predetermined count and inhibiting energization of said light when the count of said energy counter means is less than said predetermined count;

whereby a visual signal is provided to the operator signaling that the heating element is relatively hot.

12. A method of monitoring the approximate temperature of a resistive heating element adapted for operation at different power levels in response to the selection by the operator of different ones of a plurality of available settings, including an OFF setting, the heating element having a temperature response characterized by a transient heat-up phase followed by a steady state phase when the power setting is changed from OFF to another power setting and by a cool-down phase when the power setting is changed to OFF from another setting, said method comprising the steps of:

detecting a change in the power setting from OFF to another setting;

incrementing a counter at a rate determined by the selected power setting independent of the actual heating element temperature, said rate being selected from a plurality of rates, each being approximately proportional to the rate at which the heating element temperature increases during its heat-up phase when energized at a corresponding one of the available power settings;

discontinuing the incrementing of the energy counter when the count at least equals a selected one of a plurality of predetermined maximum counts, each of which is approximately proportional to the corresponding temperature of the element operating in its steady state phase at a corresponding one of said available power settings;

detecting a change in power setting to an OFF setting from another setting and decrementing the energy counter at a rate which is approximately proportional to the rate of decrease of the heating element temperature in its cool-down phase;

whereby the count of the energy counter is approximately proportional to the temperature of the heating element.

13. A method of monitoring the approximate temperature of a resistive heating element adapted for operation at different power levels in response to the selection by the operator of different ones of a plurality of available settings, including an OFF setting, the heating element having a temperature response characterized by a transient heat-up phase followed by a steady state phase when the power setting is changed from a relatively low power setting including OFF to another relatively higher power setting and by a cool-down phase when the power setting is changed to a relatively lower power setting including OFF from another relatively higher setting, said method comprising the steps of:

detecting a change in the power setting from a relatively lower power setting including OFF to another relatively higher power setting;

incrementing a counter at an increment rate determined by the selected power setting independent of the actual heating element temperature, said rate being selected from a plurality of increment rates, each approximating the rate at which the heating element temperature increases during its heat-up phase when energized at a corresponding one of the relatively higher available power settings;

discontinuing the incrementing of the energy counter when the count at least equals a selected one of a plurality of predetermined maximum counts, each of which is approximately proportional to the corresponding temperature of the element operating in its steady state phase at a corresponding one of the available power settings;

detecting a change in power setting from a relatively higher power setting to a relatively lower power setting including an OFF setting from another setting and decrementing the energy counter at a decrement rate determined by the lower selected power setting, said decrement rate being selected from a plurality of decrement rates, each approximating the rate at which the heating element temperature decreases during its cool-down phase when the power setting is changed to the lower selected setting from a relatively higher power setting;

and discontinuing the decrementing of the energy counter when the count is less than that one of the pluality of predetermined maximum counts associated with the lower selected power setting;

whereby the count of the energy counter is approximately proportional to the temperature of the heating element.

14. The method of claim 13 further comprising the step of generating a signal detectable by the operator when the count of the energy counter at least equals a predetermined count corresponding to a predetermined heating element temperature above which the element is relatively hot.

15. A power control arrangement for controlling power to a resistive heating element adapted for energization by a power signal from an external power supply in response to selection by an operator of one of a plurality of power settings including an OFF setting, the heating element having a temperature response characterized by a transient heat-up phase followed by a steady state phase when the power setting is changed from OFF to some power setting; and by a transient cool-down phase when the power setting is changed from a non-OFF setting to the OFF setting, the control arrangement comprising:

power control means for operating the heating element at different power levels in response to the selection of different ones of the power settings;

energy counter means;

counter control means for selectively incrementing said energy counter means at one of a plurality of increment rates, each of which is approximately proportional to the rate of increase of the heating element temperature during the heat-up phase when operated at a corresponding power level, said one increment rate being selected according to the power level at which the element is being operated; said counter control means being further operative to discontinue incrementing said energy counter means when said count at least equals a selected one of a plurality of predetermined maximum counts each of which is approximately proportional to the steady state heating element temperature for corresponding power settings, said selected one maximum count being selected according to the selected power setting; said counter control means being further operative to decrement said energy counter means at a predetermined decrement rate in response to selection of the OFF power setting, said predetermined decrement rate being approximately proportional to the rate of decrease of the heating element temperature during its cool-down phase;

whereby the count of said energy counter means is approximately proportional to the temperature of the heating element during the heat-up, steady state and cool-down phases of heating element operation.

16. A power control arrangement for a resistive heating element adapted for energization by a power signal from an external power supply at a power level selected by the user from a plurality of available discrete power levels including an OFF level, the heating element having a temperature response characterized when the power setting is changed from OFF to another setting by a transient heat-up phase followed by a steady state phase and by a transient cool-down phase when the power setting is changed to OFF from another setting, said control arrangement comprising:

power control means for operating the heating element at the power level corresponding to the selected power setting over repetitive control periods, each of predetermined duration, by selectively enabling energization of the heating element for a predetermined portion of each control period as a function of the selected power setting;

energy counter means for approximately tracking the temperature of the heating element;

counter control means for selectively incrementing said energy counter means during each control period at a rate determined as a function of the power level at which the heating element is being operated, said rate being such that the incremental increase in the count of said counter during each control period is approximately proportional to the increase in the temperature of the heating element during that control period, whereby the count of said energy counter means is approximately proportional to the temperature of the heating element during the heat-up phase;

said counter control means being further operative to selectively discontinue the count at one of a plurality of predetermined maximum counts, each of said plurality of maximum counts being approximately proportional to the steady state temperature for a corresponding power level setting, said one maximum count corresponding to the selected power level, whereby the count of said energy counter is approximately proportional to the temperature of the heating element during the steady state phase;

and means for detecting a change in the selected power level from a non-OFF power setting to an OFF setting, said control means being responsive to said detecting means and operative to decrement said energy counter means at a predetermined decrement rate when said change is detected, said increment rate approximating the rate at which the temperature of the heating element decrease during the cool-down phase of operation, whereby the count of said energy counter is approximately proportional to the temperature of the heating element during the cool-down phase.

17. A power control arrangement for controlling power to resistive heating element adapted for energization by an external power supply at a power level corresponding to the power setting selected by the user from a plurality of available discrete power level settings including an OFF setting, the heating element having a temperature response characterized by a transient heat-up phase followed by a steady state phase when the setting is changed from OFF to another setting and a transient cool-down phase when the setting is changed to OFF from another setting, said control arrangement comprising:

power control means for operating the heating element at different power levels in response to the selection of different ones of the power settings;

energy counter means;

counter control means for selectively incrementing and decrementing said energy counter means, said counter control means being operative to selectively increment said counter at one of a plurality of increment rates, each of which is approximately proportional to the rate of increase of the heating element temperature during the heat-up phase for a corresponding power level, said one rate being a function of the power level at which the element is being operated; said counter control means being further operative to discontinue incrementing said energy counter means when the count reaches a selected one of a plurality of maximum counts, each of said plurality of maximum counts being approximately proportional to the steady state temperature of the heating element for corresponding power level settings, said one maximum count being a function of the selected power settings; said counter control means being further operative to decrement said energy counter means at a predetermined rate when an OFF power setting is selected, said predetermined rate being approximately proportional to the rate of decrease of the heating element temperature during its cool-down phase; and indicator means responsive to said energy counter means operative to generate a signal detectable by the operator when a predetermined relationship exists between the count of said energy counter and a predetermined reference value, signifying the existence of a particular operating condition of the heating element, thereby indicating to the operator the existence of the particular operating condition.

18. The control arrangement of claim 17 wherein said predetermined reference value is representative of a relatively hot temperature and wherein said predetermined relationship exists when said count of said energy counter means is greater than said reference value, thereby indicating to the operator that the heating element is relatively hot.

19. A control arrangement in accordance with claim 18 wherein said indicator means comprises an indicator light which generates a visual signal when energized, and means for energizing said light when the count of said energy counter means is greater than said predetermined count and inhibiting energization of said light when the count of said energy counter means is less than said predetermined count;

whereby a visual signal is provided to the operator signaling that the heating element is relatively hot.

20. A control arrangement in accordance with claim 19 wherein said indicator light comprises a light emitting diode.

21. A power control arrangement for controlling power to a resistive heating element adapted for energization by a power signal from an external power supply in response to selection by an operator of one of a plurality of power settings including an OFF setting, the heating element having a temperature response characterized when the power setting changes from OFF to some power setting by a transient heat-up phase followed by a steady state phase and by a transient cool-down phase when the power setting changes from a non-OFF setting to the OFF setting, the control arrangement comprising:

power control means for operating the heating element at different power levels in response to the selection of different ones of the power settings;

energy counter means;

counter control means for selectively incrementing said energy counter means at one of a plurality of increment rates, each of which is approximately proportional to the rate of increase of the heating element temperature during the heat-up phase when operated at a corresponding power level, said one increment rate being selected according to the power level at which the element is being operated; said counter control means being further operative to discontinue incrementing said energy counter means when said count at least equals a selected one of a plurality of maximum counts each of which is approximately proportional to the steady state heating element temperature for corresponding power settings, said selected one maximum count being selected according to the selected power setting; said counter control means being further operative to decrement said energy counter means at a predetermined decrement rate in response to selection of the OFF power setting, said predetermined decrement rate being approximately proportional to the rate of decrease of the heating element temperature during its cool-down phase; and indicator means for indicating when the heating element is relatively hot, having a first state representing a relatively hot element and a second state representing a relatively cool element, said indicator means being responsive to said energy counter means and operative to assume its first state when the count of said energy counter at least equals a predetermined count and to assume its second state otherwise.

22. The control arrangement of claim 21 wherein said indicator means comprises an indicator light and means for energizing said light when said count at least equals said predetermined count and de-energizing said light when said count is less than said predetermined count.

23. A power control arrangement for a resistive heating element of the type having a temperature response characterized by a transient heat-up, a steady state and a transient cool-down phase of operation and adapted for energization by a pulsating power supply at a power level selected by the user from a plurality of available discrete power level settings including an OFF setting, said control arrangement comprising:

power level selection means for enabling the operator to select one of the plurality of power level settings and operative to generate a power level signal representing the power level selected;

power control means responsive to said power level signal for controlling the duty cycle of the heating element to operate the heating element at the selected power level;

energy counter means;

counter control means for selectively incrementing and decrementing said energy counter means, said counter control means being operative to selectively increment said counter at one of a plurality of increment rates, each of which is approximately proportional to the rate of increase of the heating element temperature during the heat-up phase for a corresponding power level selection, said one rate being a function of the selected power level; said counter control means being further operative to discontinue incrementing said energy counter means when the count reaches a selected one of a plurality of maximum counts, each of said plurality of maximum counts being approximately proportional to the steady state temperature of the heating element for corresponding power level selections, said one maximum count being a function of the selected power level; said counter control means being further operative to decrement said energy counter means at a predetermined rate when an OFF power level is selected, said predetermined rate being approximately proportional to the rate of decrease of the heating element temperature when the heating element is de-energized during the heat-up, steady state and cool-down phases of heating element operation; and indicator means responsive to said energy counter means operative to generate a signal detectable by the operator when the count of said energy counter is greater than a predetermined count and to inhibit said signal when said count is less than said predetermined count, said predetermined count being approximately proportional to a heating element temperature above which the heating element is relatively hot and below which the heating element is relatively cool; whereby a signal is provided enabling the operating to distinguish between a relatively hot and a relatively cool heating element.

24. A control arrangement in accordance with claim 23 wherein said indicator means comprises an indicator light which generates a visual signal when energized and means for energizing said light when the count of said energy counter means is greater than said predetermined count and inhibits energization of said light when the count of said energy counter means is less than said predetermined count;

whereby a visual signal is provided to the operative signaling that the heating element is relatively hot.

25. A control arrangement in accordance with claim 24 wherein said indicator light comprises a light emitting diode.

26. A method of monitoring the approximate temperature of a resistive heating element adapted for operation at different power levels in response to the selection by the operator of different ones of a plurality of variable settings, including an OFF setting, and informing the operator of an appliance incorporating a heating element that the heating element is relatively hot comprising the steps of:

detecting a change in the power setting from OFF to another setting;

incrementing an energy counter at a rate determined by the power level for the heating element independent of the actual heating element temperature, which rate is approximately proportional to the rate of temperature increase of the heating element when energized at that level; generating a signal detectable by the operator when the count of the energy counter at least equals a predetermined count corresponding to a predetermined heating element temperature above which the element is relatively hot; detecting a change in power setting from a non-OFF to an OFF setting;

decrementing the energy counter at a rate which is approximately proportional to the rate at which the temperature of the heating element decreases when de-energized; and inhibiting the signal when the count decreases below the predetermined count.

* * * * *